(12) United States Patent
Murakami et al.

(10) Patent No.: US 8,395,688 B2
(45) Date of Patent: Mar. 12, 2013

(54) SOLID-STATE IMAGING DEVICE HAVING A SHORTENED CORRELATED DOUBLE SAMPLING (CDS) PERIOD, DRIVING METHOD OF THE SAME, AND CAMERA INCLUDING THE SAME

(75) Inventors: Masashi Murakami, Kyoto (JP); Kenji Watanabe, Osaka (JP); Masayuki Hirota, Kyoto (JP); Kenichi Shimomura, Hyogo (JP)

(73) Assignee: Panasonic Corporation, Osaka (JP)

( * ) Notice: Subject to any disclaimer, the term of this patent is extended or adjusted under 35 U.S.C. 154(b) by 622 days.

(21) Appl. No.: 12/665,182

(22) PCT Filed: Jun. 27, 2008

(86) PCT No.: PCT/JP2008/001693
§ 371 (c)(1),
(2), (4) Date: Dec. 17, 2009

(87) PCT Pub. No.: WO2009/001569
PCT Pub. Date: Dec. 31, 2008

(65) Prior Publication Data
US 2010/0194948 A1 Aug. 5, 2010

(30) Foreign Application Priority Data

Jun. 28, 2007 (JP) ................................. 2007-171292

(51) Int. Cl.
*H04N 3/14* (2006.01)
*H04N 5/335* (2011.01)
(52) U.S. Cl. ....................................... 348/308; 348/302
(58) Field of Classification Search .......... 348/300–302, 348/308
See application file for complete search history.

(56) References Cited

U.S. PATENT DOCUMENTS

| 6,633,335 | B1 | 10/2003 | Kwon et al. | |
|---|---|---|---|---|
| 2003/0043089 | A1* | 3/2003 | Hanson et al. | 345/55 |
| 2005/0206548 | A1 | 9/2005 | Muramatsu et al. | |

(Continued)

FOREIGN PATENT DOCUMENTS

| JP | 11-331883 | 11/1999 |
|---|---|---|
| JP | 2002-027331 | 1/2002 |

(Continued)

OTHER PUBLICATIONS

Machine English Translation of JP 2002-027331 A (Jan. 25, 2002).*

(Continued)

*Primary Examiner* — Nelson D. Hernández Hernández
(74) *Attorney, Agent, or Firm* — McDermott Will & Emery LLP

(57) ABSTRACT

The solid-state imaging device according to the present invention includes: pixel units arranged two-dimensionally in rows and columns; signal holding units each holding an analog signal outputted from one of the pixel units in a corresponding one of the columns; and column AD circuits each converting, into a digital signal, the analog signal held by a corresponding one of said signal holding units. The signal holding units and the column AD circuits are respectively provided for the columns of the pixel units. Each of the signal holding units includes: a switching element connected to a column signal line through which the analog signal outputted from the one of the pixel units is transmitted; and a capacitor element holding the analog signal and being connected to the column signal line through the switching element.

9 Claims, 14 Drawing Sheets

U.S. PATENT DOCUMENTS

| | | | |
|---|---|---|---|
| 2006/0013485 A1 | 1/2006 | Nitta et al. | |
| 2006/0164529 A1* | 7/2006 | Shimizu | 348/308 |
| 2007/0046795 A1* | 3/2007 | Yamashita | 348/294 |
| 2008/0158359 A1 | 7/2008 | Takeda | |
| 2008/0185500 A1 | 8/2008 | Toshikiyo | |
| 2009/0059047 A1 | 3/2009 | Murata et al. | |
| 2009/0166513 A1 | 7/2009 | Abe et al. | |
| 2009/0283663 A1 | 11/2009 | Ryuzaki et al. | |

FOREIGN PATENT DOCUMENTS

| | | |
|---|---|---|
| JP | 2002-27331 | 1/2002 |
| JP | 2003-051989 | 2/2003 |
| JP | 2005-323331 | 11/2005 |
| JP | 2006-33452 | 2/2006 |

OTHER PUBLICATIONS

English language Abstract of JP 2002-27331, Jan. 25, 2002.
English language Abstract of JP 11-331883, Nov. 30, 1999.
English language Abstract of JP 2006-33452, Feb. 2, 2006.
English language Abstract of JP 2005-323331, Nov. 17, 2005.
Japanese Office Action, dated Aug. 30, 2011, in corresponding Japanese Patent Application No. 2007-171292.

* cited by examiner

SOLID-STATE IMAGING DEVICE HAVING A SHORTENED CORRELATED DOUBLE SAMPLING (CDS) PERIOD, DRIVING METHOD OF THE SAME, AND CAMERA INCLUDING THE SAME

TECHNICAL FIELD

The present invention relates to a solid-state imaging device, a camera system, and a driving method of the device and the system.

BACKGROUND ART

In recent years, various signal reading methods have been put forth for CMOS imaging sensors. In general, CMOS imaging sensors of a column-parallel-output type are often used. The CMOS imaging sensors select pixels of a row in a pixel array, and reads, in a column direction, signals generated in each of the pixels.

Out of such CMOS imaging sensors, a conventional imaging sensor disclosed in Patent Reference 1 will be described with reference to FIG. 1. FIG. 1 schematically illustrates a conventional CMOS solid-state imaging device (CMOS imaging sensor) including AD converting devices on a semiconductor substrate on which pixel units are arranged.

As illustrated in FIG. 1, the solid-state imaging device 1 includes: a pixel array (imaging unit) 10 that includes unit pixels 3 in rows and columns; a driving control unit 7 that is arranged outside the pixel array 10; a column processing unit 26 including column AD circuits 25 for each of the vertical columns; a reference signal generating unit 27 including a digital analog converter (DAC) 27a for supplying reference voltages for AD conversion to the column AD circuits 25 in the column processing unit 26; and an output circuit 28.

Furthermore, the driving control unit 7 includes: a horizontal scanning circuit (column scanning circuit) 12 for controlling a column address and scanning of a column; a vertical scanning circuit (row scanning circuit) 14 for controlling a row address and scanning of a row; and a communication/timing control unit 20 for receiving a master clock CLK0 through a terminal 5a, generating various internal clocks, and controlling, for example, the horizontal scanning circuit 12 and the vertical scanning circuit 14.

Furthermore, each of the unit pixels 3 is connected to a row control line 15 controlled by the vertical scanning circuit 14, and to a vertical signal line 19 through which a pixel signal is transmitted to the column processing unit 26.

Furthermore, each of the column AD circuits 25 includes a voltage comparator 252 that compares a reference voltage RAMP generated by the reference signal generating unit 27 with an analog pixel signal obtained through one of vertical signal lines 19 (H0, H1, . . . ) from one of the unit pixels 3, for each of the row control line 15 (V1, V2, . . . ); a data storing unit 256 that is a memory holding a result of counting by a counting unit 254 until the voltage comparator 252 completes the comparison processing, and has a n-bit AD conversion function.

Furthermore, the stepwise reference voltage RAMP generated in the reference signal generating unit 27 is fed to one input terminal RAMP of the voltage comparators 252, and a corresponding one of the vertical signal lines 19 is connected to the other one of the input terminals so that pixel signal voltages are respectively provided from the pixel array 10. Furthermore, an output signal of each of the voltage comparators 252 is supplied to a corresponding one of the counting units 254.

Furthermore, each of the column AD circuits 25 has a structure for allowing AD conversion by the processes of supplying the reference voltage RAMP to a corresponding one of the voltage comparators 252, simultaneously starting to count a clock signal, and comparing the reference voltage RAMP with the analog pixel signal fed through a corresponding one of the vertical signal lines 19, while the comparison continues until a pulse signal is obtained.

As well as the AD conversion, processing is performed on a pixel signal, in a voltage mode, provided through each of the vertical signal lines 19. The processing is for calculating a difference between a signal level (noise level) of the pixel signal immediately after a pixel is reset and an actual signal level Vsig of the pixel signal. The signal level Vsig corresponds to an amount of light incident on each of the unit pixels 3. With the processing, a noise signal component referred to as a Fixed Pattern Noise (FPN) or a reset noise can be removed. FIG. 1 illustrates the structure for extracting only the actual signal level Vsig by counting down the noise level and counting up the signal level.

Furthermore, the pixel data digitalized by each of the column AD circuits 25 is transmitted to a horizontal signal line 18, through a horizontal selection switch that is not illustrated and is driven by a horizontal selection signal from the horizontal scanning circuit 12, and further transmitted to the output circuit 28.

With the structure, the pixel signals are successively outputted for each of the rows and columns from the pixel array 10 in which light-receiving elements as charge generating units are arranged in a matrix. Then, an image corresponds to the pixel array 10 in which the light-receiving elements are arranged in the matrix, that is, a frame image is represented by a collection of the pixel signals in the entire pixel array 10.

Next, the detailed operations of the column AD circuits 25 included in the solid-state imaging device indicated as a conventional art will be described with reference to FIG. 1 and a timing chart in FIG. 3.

In the first read operation, the communication/timing control unit 20 resets a count value of each of the counting units 254 to an initial value "0", and sets the counting units 254 to a down-count mode. After reading from each of the unit pixels 3 in any row Vx to a corresponding one of the vertical signal lines 19 (H1, H2, . . . ) becomes stable, the communication/timing control unit 20 supplies control data 4 for generating a reference voltage RAMP to the reference signal generating unit 27.

Upon receipt of the control data 4, the reference signal generating unit 27 supplies a staircase waveform (RAMP waveform) that temporally varies in a staircase manner on the whole, as a comparison voltage for the one input terminal RAMP of each of the voltage comparators 252. Each of the voltage comparators 252 compares the comparison voltage having the RAMP waveform with a voltage of a pixel signal, in any of the vertical signal lines 19 (Hx), to be supplied from the pixel array 10.

Furthermore, each of the counting units 254 measures a time period for comparison by a corresponding one of the voltage comparators 252 that are arranged in the columns, simultaneously when the reference voltage RAMP having the RAMP waveform is fed to the one input terminal RAMP of the corresponding one of the voltage comparators 252. In order to do so, the communication/timing control unit 20 supplies a count clock CK0 to a clock terminal of each of the counting units 254, and the counting units 254 start to count down the count clock CK0 from the initial value "0" as the first count operation, in synchronization with the transmission of the voltages having the RAMP waveform from the reference signal generating unit 27 (t10).

Furthermore, each of the voltage comparators 252 compares the reference voltage RAMP having the ramp waveform from the reference signal generating unit 27, with the pixel signal voltage Vx fed through a corresponding one of the vertical signal lines 19. When the voltages match with each other, the output level of the voltage comparators 252 is inverted from a high level to a low level (t12).

In other words, each of the voltage comparators 252 compares a voltage signal corresponding to a reset component Vrst with the reference voltage RAMP, and a corresponding one of the counting units 254 measures a magnitude of the reset component Vrst using the count clock CK0 in a time axis direction to obtain a count value corresponding to the reset component Vrst. In other words, each of the counting units 254 measures a time period from the change in the voltage comparator RAMP waveform (in other words, when each of the counting units 254 starts the counting process) to inversion of the output of a corresponding one of the voltage comparators 252, resulting in the count value corresponding to the reset component Vrst.

Furthermore, when a predetermined down-count period passes (t14), the communication/timing control unit 20 stops supplying (i) control data to the voltage comparators 252 and (ii) the count clocks CK0 to the counting units 254. Thereby, each of the voltage comparators 252 stops generating the reference voltage RAMP having the ramp waveform.

Since the count operation is performed with detection of a reset level Vrst in the pixel signal voltage Vx by the voltage comparators 252 in the first read operation, a reset component ΔV of each of the unit pixels 3 is read.

Next, in the second read operation, the signal level Vsig corresponding to the amount of light incident on each of the unit pixels 3 and the reset component ΔV are read. The difference between the first and second read operations is that the counting units 254 are set to an up-count mode in the second read operation. Performing the second read operation in the same manner as that of the first read operation results in obtainment of a count value corresponding to the signal component Vsig.

In FIGS. 1 and 3, each of the counting units 254 performs the down-count operation in the first read operation, and the up-count operation in the second read operation. Thus, the counting units 254 automatically perform subtraction to obtain a count value corresponding to only the signal component Vsig, with respect to a count value "0".

Patent Reference 1: Japanese Unexamined Patent Application Publication No. 2005-323331

DISCLOSURE OF INVENTION

Problems that Invention is to Solve

In the conventional art of Patent Reference 1 disclosing the structure of AD conversion units of the column-parallel-output type, AD conversion on reset components needs to be performed during a period between reading analog signals of pixels and reading the reset components. Thus, there is a first problem that shortening an AD conversion period shown in FIG. 3 is difficult.

Furthermore, the analog reset components of the pixels are read after completion of the AD conversion operation on the signal components of the pixels, in the AD conversion structure. Thus, there is a second problem that shortening the AD conversion period shown in FIG. 3 is difficult.

With the first and second problems, the number of bits for the AD conversion increases. Alternatively, as the AD conversion period necessary in a horizontal scanning period is prolonged due to a driving operation, such as pixel mixture, the AD conversion period becomes longer than a signal output period. Thus, a fast read operation that is one of the features of (i) the solid-state imaging device including an AD conversion circuit provided for each column and (ii) the solid-state imaging device of the column-parallel-output type becomes difficult.

With the first problem, since a Correlated Double Sampling (CDS) period is prolonged by an AD conversion period for the reset components in the solid-state imaging device including conventional analog reading circuits including no column AD circuit, there is a third problem that 1/f noise in a pixel source follower circuit (pixel SF circuit) increases, and a fixed pattern noise (non-uniformity) is degraded particularly in dark conditions.

Furthermore, as the CDS period is longer, a period of holding signals of signal components by a charge-holding floating diffusion (FD) unit in each of the pixel units 3 becomes longer when the signal components are read. Thus, there is a fourth problem that the influence of leakage current in the charge-holding FD units increases and a fixed pattern noise (non-uniformity, flaw) is degraded in dark conditions.

The present invention has an object of providing a solid-state imaging device including column AD conversion units, a driving method of the same, and a camera including the same, for shortening the CDS period and for suppressing noise.

Means to Solve the Problems

The solid-state imaging device according to an aspect of the present invention includes: pixel units arranged two-dimensionally in rows and columns; signal holding units which are respectively provided for the columns of the pixel units and each of which is configured to hold an analog signal outputted from one of the pixel units in a corresponding one of the columns; and AD conversion units each configured to convert, into a digital signal, the analog signal held by a corresponding one of the signal holding units, the AD conversion units being respectively provided for the columns of the pixel units.

With the structure including the signal holding units respectively between the pixel units and the AD conversion units, the operations of converting the analog signals into digital signals by the AD conversion units can be performed in parallel with the operations of reading the analog signals from the pixel units. The parallelization can shorten a CDS period even while the AD conversion is performed. Furthermore, with the shortened CDS period, occurrence of 1/f noise, in particular, a non-uniformity component in dark conditions can be suppressed.

Here, each of the signal holding units may include: a switching element connected to a column signal line through which the analog signal is transmitted, the analog signal being outputted from the one of the pixel units in the corresponding one of the columns; and a capacitor element that holds the analog signal, the capacitor element being connected to the column signal line through the switching element.

With the structure, each of the signal holding units can be composed of a simple circuit.

Here, the solid-state imaging device may further include a driving control unit configured to maintain an off-state of the switching elements during conversion operations by the AD conversion units, and drive the conversion operations and read operations from the pixel units in parallel, the read operations being respectively performed for reading analog signals including the analog signal to the column signal lines.

Furthermore, during the AD conversion periods of the signal components of pixels, analog output units each outputting an analog pixel signal can be electrically isolated from the signal holding units, and the leakage components occurring in the charge holding units in the pixel units can be prevented from being supplied to the signal holding units.

Here, each of the pixel units may include: a photo-electric conversion unit configured to convert light into a signal charge; a charge holding unit configured to hold the signal charge transferred from the photo-electric conversion unit; an amplifying unit configured to amplify the signal charge held by the charge holding unit; and a reset unit configured to reset the signal charge held by the charge holding unit, the solid-state imaging device may further comprise a driving control unit configured to drive the pixel units, the signal holding units, and the AD conversion units, the driving control unit may be configured to drive each of operations from a first period to a fourth period, during the first period, the analog signal (i) outputted by the amplifying unit and (ii) indicating a reset component may be read from the one of the pixel units while the charge holding unit may be reset, during the second period, the analog signal (i) held by the signal holding unit and (ii) indicating the reset component may be converted into the digital signal, during the third period, the analog signal (i) outputted by the amplifying unit and (ii) indicating a signal component may be read from the one of the pixel units while the charge holding unit holds the signal charge transferred from the photo-electric conversion unit, during the fourth period, the analog signal (i) held by the signal holding unit and (ii) indicating the signal component may be converted into the digital signal, and the driving control unit may be configured to perform the driving so that at least one of (i) the second period and the third period overlap each other and (ii) the fourth period and the first period corresponding to a row other than a current row overlap each other.

Here, the driving control unit may be configured to perform the driving so that the second period and the third period overlap each other.

Here, each of the signal holding units may include: a switching element connected to a column signal line through which the analog signal is transmitted, the analog signal being outputted from the one of the pixel units in the corresponding one of the columns; and a capacitor element that holds the analog signal, the capacitor element being connected to the column signal line through the switching element, and the driving control unit may be configured to cause each of the capacitor elements to hold the analog signal (i) outputted during the first period and (ii) indicating the reset component, by turning on the switching elements, and to set, in an off state, the switching elements in the conversion during the second period.

With the structure, since the second period and the third period overlap each other, the operations of converting the reset components of pixels into digital signals by the AD conversion units can be performed in parallel with the operations of reading the analog signals indicating the signal components from the pixel units. Furthermore, the leakage components occurring in the charge holding units in the pixel units can be prevented from being supplied to the signal holding units.

Here, the driving control unit may be configured to perform the driving so that the fourth period and the first period corresponding to the row other than the current row overlap each other.

Here, each of the signal holding units may include: a switching element connected to a column signal line through which the analog signal is transmitted, the analog signal being outputted from the one of the pixel units in the corresponding one of the columns; and a capacitor element that holds the analog signal, the capacitor element being connected to the column signal line through the switching element, and the driving control unit may be configured to cause each of the capacitor elements to hold the analog signal (i) outputted during the third period and (ii) indicating the signal component, by turning on the switching elements, and to set, in an off state, the switching elements in the conversion during the fourth period.

With the structure, since the fourth period and the first period corresponding to a row other than a current row overlap each other, the operations of converting the signal components of pixels into digital signals by the AD conversion units can be performed in parallel with the operations of reading the reset components of pixels in the other row in the analog manner by the amplifying units. Furthermore, the leakage components occurring in the charge holding units in the pixel units can be prevented from being supplied to the signal holding units.

The solid-state imaging device may further include column amplifiers each of which amplifies the analog signal outputted from the one of the pixel units in the corresponding one of the columns, the column amplifiers being provided for the columns of the pixel units and being connected to the capacitor elements through the switching elements, respectively.

With the structure, output voltages corresponding to the analog signals and provided from the pixel units can be amplified, and improvement on a signal-to-noise ratio and switching gains become possible.

Furthermore, the solid-state imaging device used for the driving method and used in a camera according to an aspect of the present invention has the same structure and effect as that of the solid-state imaging device as described therebefore.

Effects of the Invention

According to the solid-state imaging device of an aspect of the present invention, the operations of reading the analog signals of pixels can be performed in parallel with the AD conversion operations by the AD conversion units, and the CDS period during which the pixels are read can be shortened. With the shortened CDS period, the occurrence of 1/f noise, in particular, a non-uniformity component in dark conditions can be suppressed.

Furthermore, during the AD conversion period for converting the signal components of pixels, the analog output units each outputting a pixel signal can be electrically isolated from the signal holding units, and the leakage components occurring in the charge-holding FD units in the unit pixels can be prevented from being supplied to the signal holding units.

Furthermore, a period for reading the reset components of the pixels in the analog manner is set equal to a period for reading the signal components of the pixels so that a state of reading the reset components can be the same as a state of reading the signal components, thus enhancing the advantage of removing noise in Correlated Double Sampling. For example, even when there is a difference and a variation in a period up to the stabilization in the charge-holding FD units between a center of pixels and a vicinity of the pixels, as long as the difference and the variation remain the same in the pixels during reading the reset components and reading the signal components, noise can be removed using the CDS, and a defect in shading in an image can be suppressed.

Furthermore, with the shortened CDS period, the horizontal scanning period can be shortened. Particularly, when the number of bits for the AD conversion is many and the AD conversion on a larger number of rows is necessary, such as for coping with the pixel mixture, for example, during a horizontal scanning period, the AD conversion period for pixels becomes longer than the horizontal scanning period for the pixels. Thus, the advantage of shortening the CDS period is enhanced.

Figure 7:
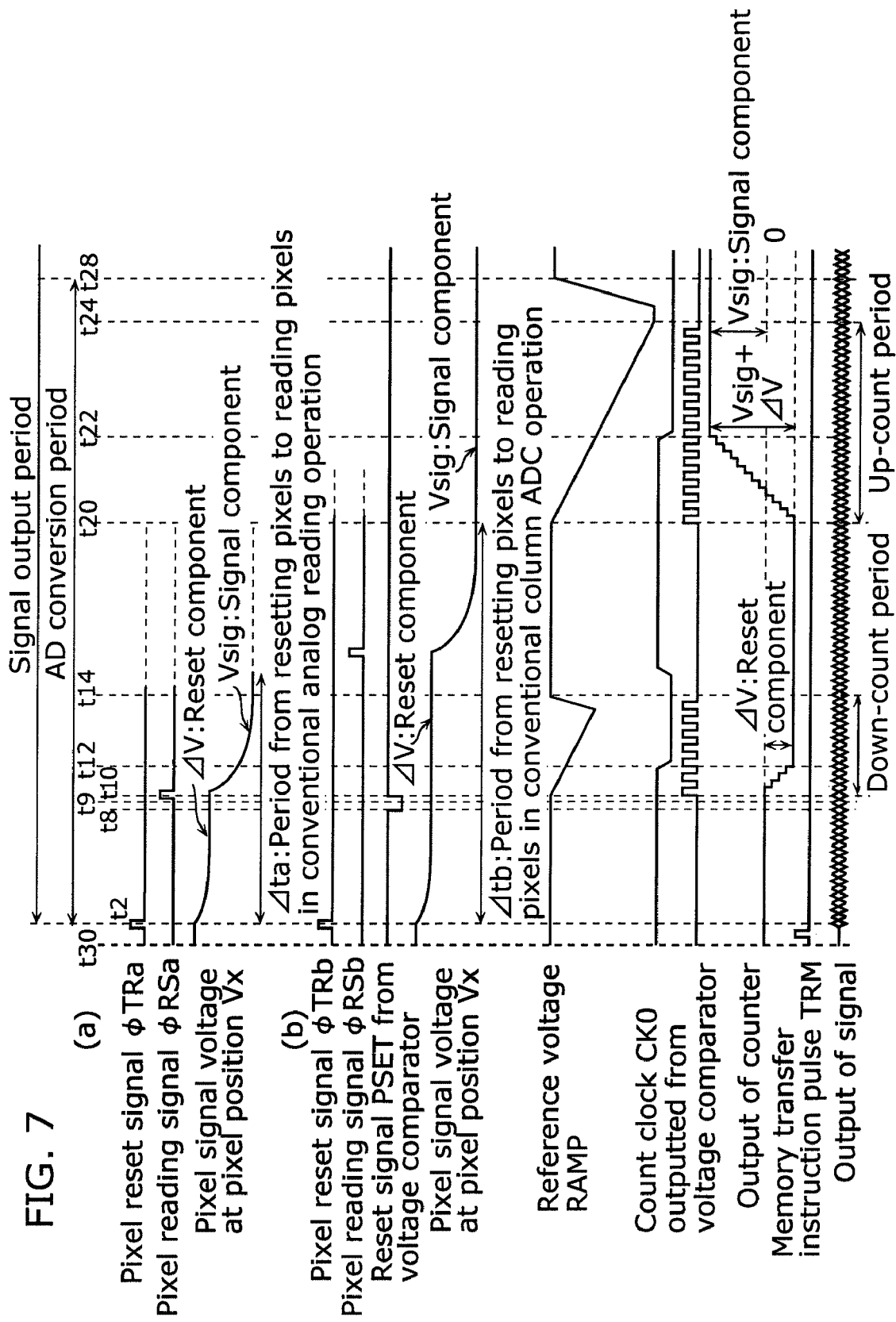

(a) in FIG. 7 shows a specific example of a timing chart for describing a FD leakage problem in the solid-state imaging device of the reference technique. (b) in FIG. 7 shows a specific example of a timing chart for describing a FD leakage problem in the solid-state imaging device in FIG. 1.

Figure 8:
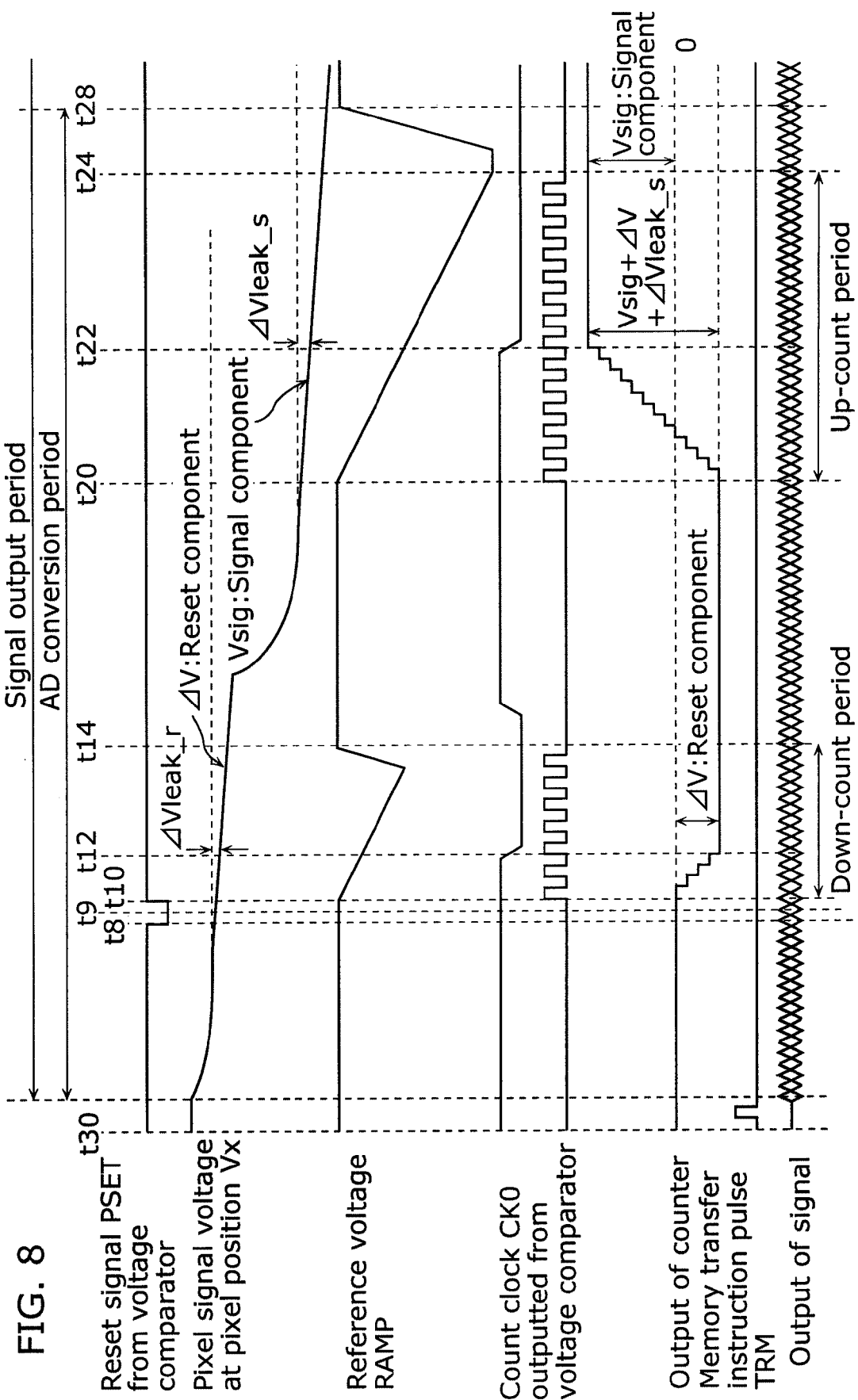

FIG. 8 shows a timing chart when FD leakage occurs in the charge-holding FD units of pixels.

Figure 9:
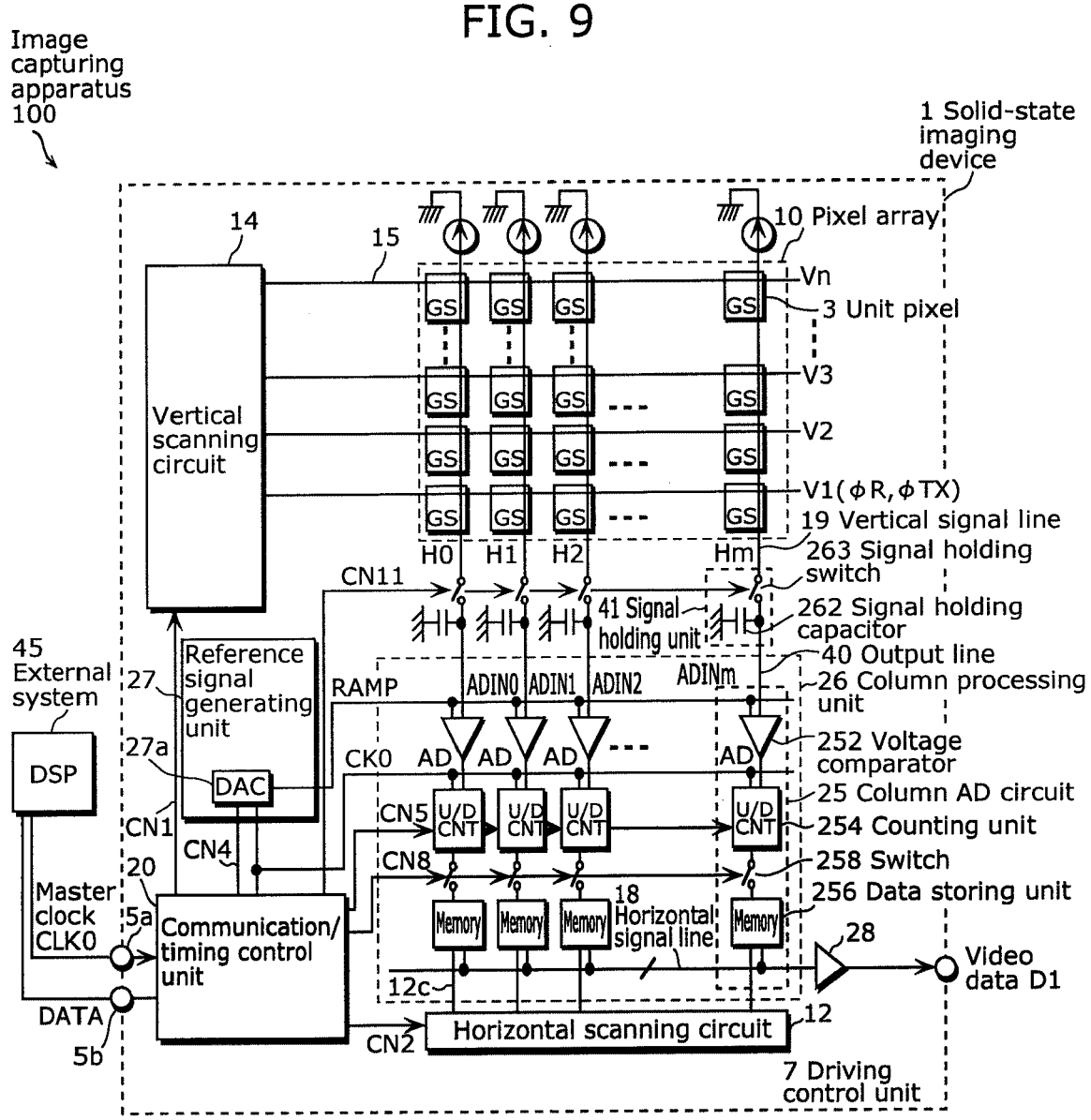

FIG. 9 illustrates a specific example of a circuit block diagram of a solid-state imaging device according to Embodiment 1.

Figure 10:
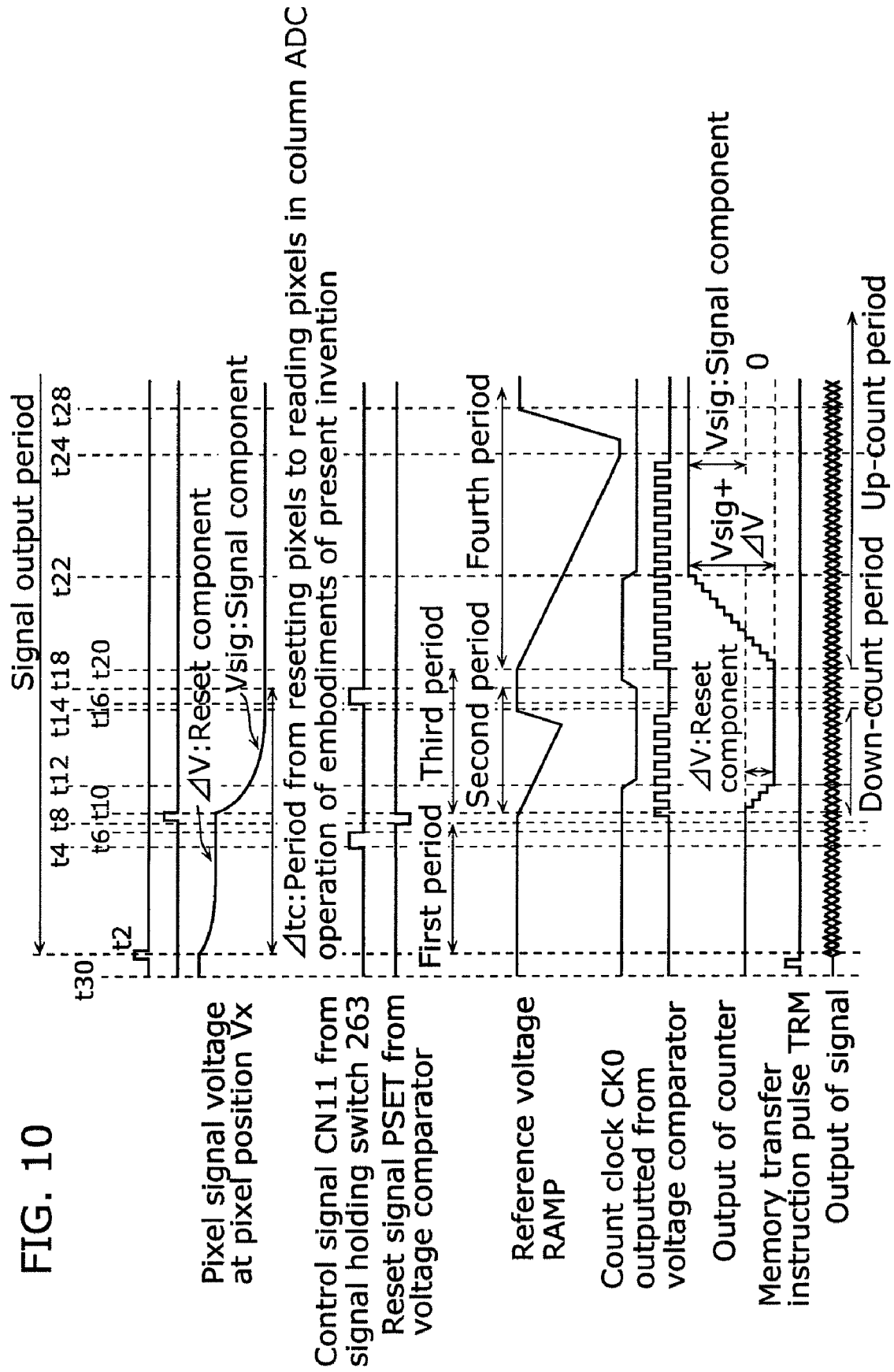

FIG. 10 illustrates a specific example of a timing chart of the solid-state imaging device according to Embodiment 1.

Figure 11:
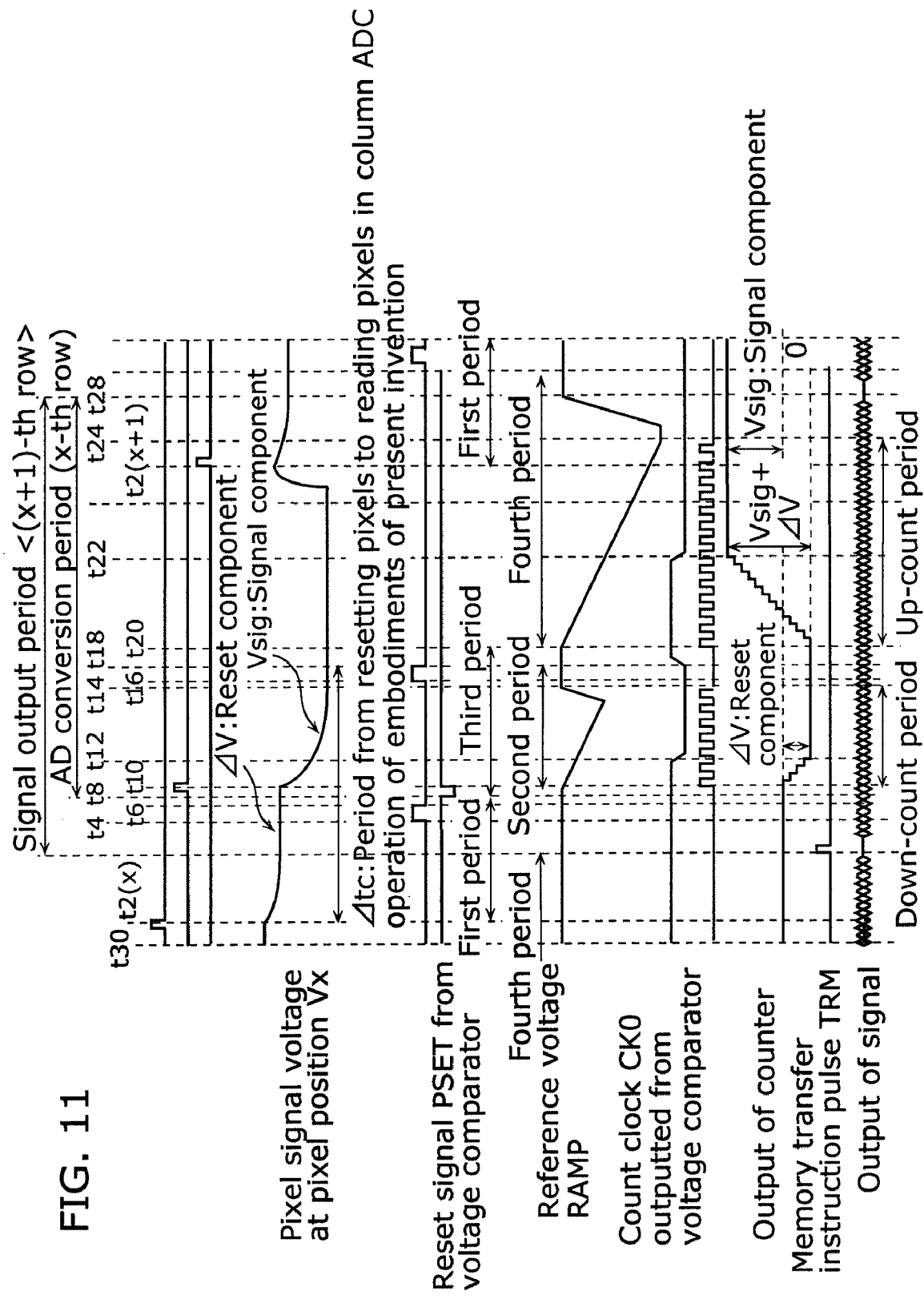

FIG. 11 illustrates a specific example of a timing chart of a solid-state imaging device according to Embodiment 2.

Figure 12:
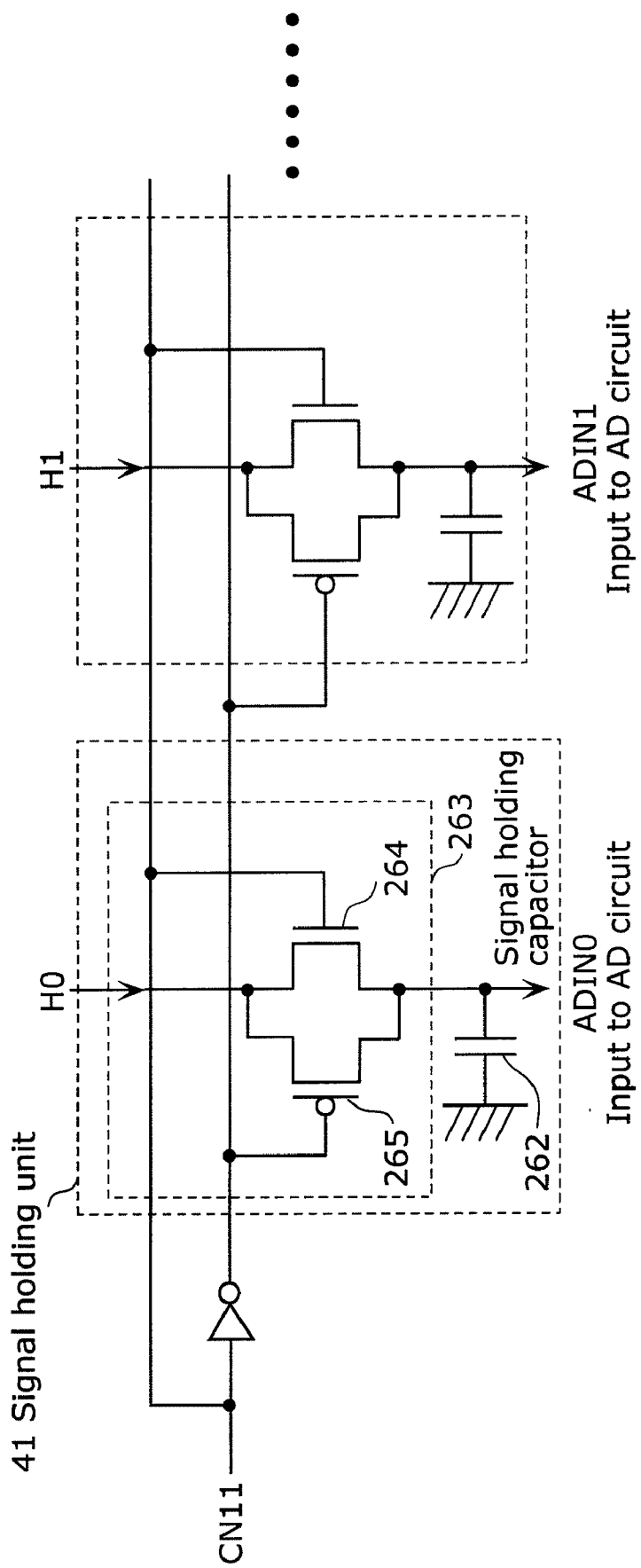

FIG. 12 illustrates a specific example of a circuit block diagram of a signal holding unit according to Embodiments 1 and 2.

Figure 13:
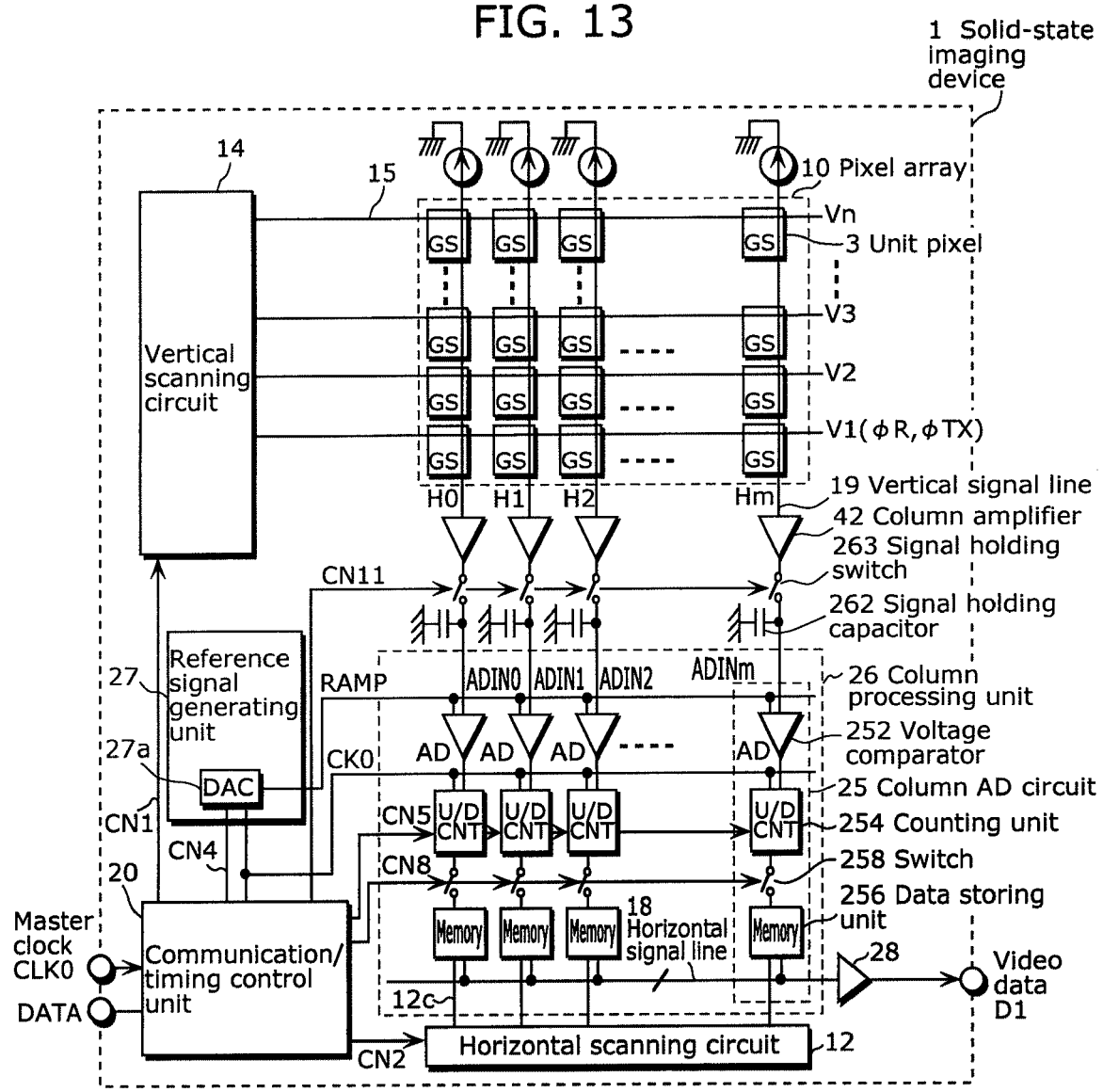

FIG. 13 illustrates a specific example of a circuit block diagram of a solid-state imaging device including column amplifiers according to Embodiments 1 and 2.

Figure 14:
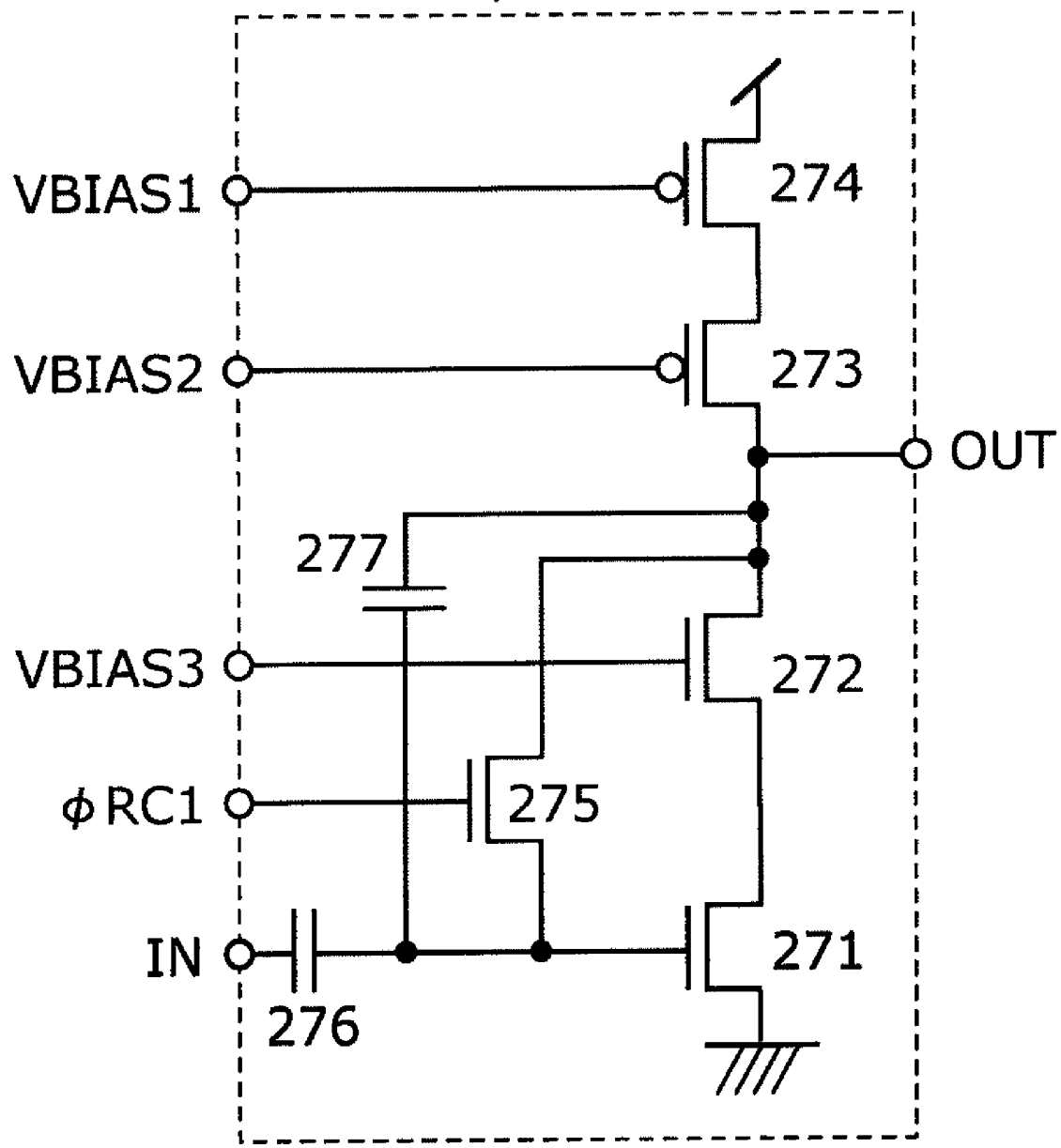

FIG. 14 illustrates a specific example of a circuit block diagram of a column amplifier.

NUMERICAL REFERENCES

1 Solid-state imaging device
3 Unit pixel
10 Pixel array
12 Horizontal scanning circuit
14 Vertical scanning circuit
18 Horizontal signal line
19 Vertical signal line
20 Communication/timing control unit
25 Column AD circuit
26 Column processing unit
27 Reference signal generating unit
27a DAC
28 Output circuit
41 Signal holding unit
42 Column amplifier
44 Analog CDS circuit
254 Counting unit
262 Signal holding capacitor
263 Signal holding switch

BEST MODE FOR CARRYING OUT THE INVENTION

In a solid-state imaging device, a driving method of the same, and an image capturing apparatus according to Embodiment 1 of the present invention to be described in detail hereinafter, pixels each including at least a photo-electric conversion unit, a signal charge holding unit, a reset unit, and an amplifying unit are arranged two-dimensionally in rows and columns. The solid-state imaging device including analog/digital (AD) conversion units in which the pixels are respectively arranged for each of the columns and each of which is configured to convert an analog signal outputted by the amplifying unit included in each of the pixels into a digital signal has: a first period during which the amplifying units of the pixels output reset components of the pixels in the analog manner; a second period during which the AD conversion units provided for the columns convert the reset components into the digital signals; a third period during which the amplifying units output signal components of the pixels in the analog manner; and a fourth period during which the AD conversion units convert the signal components into the digital signals, and the second period and the third period overlap each other.

With the structure, since the amplifying units can output the signal components of the pixels in the analog manner during when the AD conversion units convert the reset components into the digital signals, the operation of outputting the pixels in the analog manner can be performed in parallel with the digital conversion by the AD conversion units.

Furthermore, the solid-state imaging device includes pixels (i) each of which includes at least a photo-electric conversion unit, a signal charge holding unit, a reset unit, and an amplifying unit and (ii) which are arranged two-dimensionally in rows and columns, and AD conversion units each configured to convert an analog signal outputted by the amplifying unit included in each of the pixels into a digital signal. The solid-state imaging device has: the first period during which the amplifying units of the pixels output reset components of the pixels in the analog manner; the second period during which the AD conversion units provided for the columns convert the reset components of the pixels into digital signals; the third period during which the amplifying units output signal components of the pixels in the analog manner; and the fourth period during which the AD conversion units convert the signal components of the pixels into the digital signals, and the first period and the fourth period overlap each other.

With the structure, since the amplifying units can output the reset components of pixels in the next row in the analog manner during when the AD conversion units convert the signal components of the pixels into the digital signals, the operation of outputting the pixels in the analog manner can be performed in parallel with the digital conversion by the AD conversion units.

Furthermore, the signal holding units downstream of the amplifying units are preferably provided between the amplifying units and the AD conversion units. For example, the AD conversion on the reset components may be performed in parallel with reading the signal components of the pixels in the analog manner by holding the analog reset signals of the pixels by the signal holding units. Furthermore, the AD conversion on the signal components of the current row may be performed in parallel with reading the reset components of the pixels in the next row by holding analog signals indicating the signal components of the pixels by the signal holding units.

Furthermore, each of the signal holding units includes a MOS transistor and a capacitor element, and preferably, one of a source terminal and a drain terminal of the MOS transistor is connected to an output terminal of a pixel, and the other one of the source terminal and the drain terminal of the MOS transistor is connected to the capacitor element, in each of the signal holding units. With the structure, each of the capacitor elements holds the analog signal, and the MOS transistors can electrically isolate the pixel output units from the signal holding units and connect the pixel output units to the signal holding units, so that the read operations of the analog signals of pixels can be performed in parallel with the AD conversion operations.

Furthermore, the solid-state imaging device includes, preferably, a control unit that controls the timing at which an analog signal is held and that is connected to a gate terminal of the MOS transistor included in each of the signal holding units. With the structure, the gate terminals of the MOS transistors can be controlled at any timing, and the controlling can be performed at the optimal timing in each of different driving modes including a full-image reading mode, a pixel mixture mode, and a skipping mode.

The driving method includes: a first step of turning on a MOS transistor included in each of the signal holding units, and holding analog output of reset components of pixels by the signal holding capacitors; and a second step of isolating a connection between the analog output units for outputting the pixel signals and the signal holding capacitors, wherein the second period during which the AD conversion units provided for the columns convert the reset components into digital signals and the third period during which the amplifying units output the signal components of the pixels in the analog manner preferably overlap each other.

With the structure, after the signal holding capacitors hold the reset components of the pixels and during a period when the AD conversion units convert the reset components into digital signals, the analog output units can be electrically isolated from the signal holding capacitors, and the amplifying units can output the signal components in the analog manner. Thus, the analog output of pixels can be performed in parallel with the digital conversion by the AD conversion units.

Furthermore, the driving method includes: a third step of turning on a MOS transistor included in each of the signal holding units, and holding analog output of signal components of pixels by the signal holding capacitors; and a fourth step of turning off the MOS transistors, and isolating a connection between the analog output units for outputting the pixel signals and the signal holding capacitors, wherein the first period during which the amplifying units included in the pixels output the reset components of the pixels in the analog manner and the fourth period during which the AD conversion units convert the signal components into digital signals preferably overlap each other.

With the structure, after the signal holding capacitors hold the signal components of the pixels and during a period when the AD conversion units convert the signal components into the digital signals, the analog output units can be electrically isolated from the signal holding capacitors, and the amplifying units can output signal components in the next row in the analog manner. Thus, the analog output can be performed in parallel with the digital conversion by the AD conversion units.

Furthermore, the driving method includes: the first step of turning on the MOS transistor included in each of the signal holding units, and holding analog output of reset components of pixels by the signal holding capacitors; and a second step of turning off the MOS transistors, and isolating the connection between the analog output units for outputting the pixel signals and the signal holding capacitors, wherein the driving method preferably includes a fifth step of outputting the signal components of the pixels in the analog manner by the amplifying units after the second step.

With the structure, after the signal holding capacitors hold the reset components of the pixels, the analog output units can be electrically isolated from the signal holding capacitors. Then, when the signal components of the pixels are read, the signal holding capacitors can continue to hold the reset components.

Furthermore, the driving method includes: the first step of turning on the MOS transistor included in each of the signal holding units, and holding analog output of reset components of pixels by the signal holding capacitors; the second step of turning off the MOS transistors, and isolating the connection between the analog output units for outputting the pixel signals and the signal holding capacitors; the third step of turning on the MOS transistors, and holding analog output of signal components of pixels by the signal holding capacitors; and the fourth step of turning off the MOS transistors, and isolating the connection between the analog output units for outputting the pixel signals and the signal holding capacitors, wherein the driving method preferably includes the fifth step of outputting the signal components in the analog manner by the amplifying units during the second step to the fourth step.

After the fourth step and during the AD conversion period of the signal components of pixels, the structure makes it possible that the analog output units that output the pixel signals can be electrically isolated from the signal holding units, and the signal holding units are not subject to FD leakage occurring in each of the unit pixels.

Furthermore, the driving method includes: the first step of turning on the MOS transistor included in each of the signal holding units, and holding analog output of reset components of pixels by the signal holding capacitors; and the second step of turning off the MOS transistors, and isolating the connection between the analog output units for outputting the pixel signals and the signal holding capacitors, wherein the driving method preferably includes a sixth step of converting the reset components into digital signals by the AD conversion units provided for the columns, after the second step.

With the structure, even when the signal components of the pixels start to be read during the AD conversion period of the reset signals, since the pixel output units are electrically isolated from the signal holding units, reading the signal components in the analog manner can be performed in parallel with the AD conversion operations on the reset components.

Furthermore, the driving method includes: the first step of turning on the MOS transistor included in each of the signal holding units, and holding analog output of reset components of pixels by the signal holding capacitors; the second step of turning off the MOS transistors, and isolating the connection between the analog output units for outputting the pixel signals and the signal holding capacitors; the third step of turning on the MOS transistors, and holding analog output of the signal components of pixels by the signal holding capacitors; and the fourth step of turning off the MOS transistors, and isolating the connection between the analog output units for outputting the pixel signals and the signal holding capacitors, wherein the driving method preferably includes a sixth step of converting the reset components of the pixels into digital signals by the AD conversion units provided for the columns during the second step to the third step.

With the structure, the AD conversion operations on the signal components can be started immediately after converting the reset components into the digital signals and then performing the fourth step.

Furthermore, the driving method includes: the third step of turning on a MOS transistor included in each of the signal holding units, and holding analog output of signal components of pixels by the signal holding capacitors; and the fourth step of turning off the MOS transistors, and isolating the connection between the analog output units for outputting the pixel signals and the signal holding capacitors, wherein the driving method preferably includes a seventh step of converting the signal components of the pixels into digital signals by the AD conversion units after the fourth step.

After the fourth step and during the AD conversion period for the signal components of pixels, the structure makes it possible that the analog output units that output the pixel signals can be electrically isolated from the signal holding units, and the signal holding units are not subject to FD leakage occurring in each of the unit pixels.

Furthermore, the driving method includes: the first step of turning on the MOS transistor included in each of the signal holding units, and holding analog output of reset components of pixels by the signal holding capacitors; and the second step of turning off the MOS transistors, and isolating the connection between the analog output units for outputting the pixel signals and the signal holding capacitors; the third step of turning on the MOS transistors, and holding analog output of signal components of pixels by the signal holding capacitors; and the fourth step of turning off the MOS transistors, and isolating the connection between the analog output units for outputting the pixel signals and the signal holding capacitors, wherein the driving method preferably includes the seventh step of converting the signal components of the pixels into digital signals by the AD conversion units during the fourth step to a first step in the next row.

With the structure, since the analog output of the reset components in the next row can be performed during the AD conversion period of the signal components of pixels in the current row, reading components of the pixels in the analog manner can be performed in parallel with the AD conversion operations.

Furthermore, a period up to the second step of isolating the connection between the analog output units for outputting the pixel signals and the signal holding capacitors from the beginning of the analog output of the reset components of the pixels is preferably set equal to a period up to the fourth step of isolating the connection between the analog output units for outputting the pixel signals and the signal holding capacitors from the beginning of the analog output of the signal components of the pixels.

With the structure, a state of reading reset components of pixels can be the same as a state of reading signal components of the pixels. More specifically, (i) frequency characteristics of a pixel SF circuit can be equalized between in reading the reset components and in reading the signal components, and (ii) the voltage variations in the charge-holding FD units, the vertical signal lines, and the signal holding units until output of pixel source followers is stabilized after the application of a pixel reading pulse can be equalized between in reading the reset components and reading the signal components. Thus, the advantage of removing noise in Correlated Double Sampling is enhanced. For example, even when there is a difference and a variation in a period up to the stabilization in the charge-holding FD units between a center of pixels and a vicinity of the pixels, as long as the difference and the variation remain the same in the pixels during reading the reset components and reading the signal components, noise can be removed using the CDS, and a defect in shading in an image can be suppressed. In other words, states of reading the reset components and reading the signal components are preferably set equal as much as possible.

Furthermore, the control unit for controlling the timing at which the analog signals are held is preferably provided as a camera system. With the structure, a gate terminal of the MOS transistor can be controlled at any timing, and the controlling can be performed at the optimal timing in each of different driving modes including a full-image reading mode, a pixel mixture mode, and a skipping mode.

In other words, the read operation for the analog signals of pixels can be performed in parallel with the AD conversion operations by the AD conversion units, and the CDS period during which the pixels are read can be shortened. With the shortened CDS period, the occurrence of 1/f noise, in particular, a non-uniformity component in dark conditions can be suppressed.

Furthermore, during the AD conversion period of the signal components of pixels, the analog output units each outputting a pixel signal can be electrically isolated from the signal holding units, and the leakage components occurring in the charge-holding FD units in the pixels can be prevented from being supplied to the signal holding units.

Furthermore, a period for reading the reset components of the pixels in the analogy manner is set equal to a period for reading the signal components of the pixels so that a state of reading the reset components can be the same as a state of reading the signal components, thus enhancing the advantage of removing noise in Correlated Double Sampling. For example, even when there is a difference and a variation in a period up to the stabilization in the charge-holding FD units between a center of pixels and a vicinity of the pixels, as long as the difference and the variation remain the same in the pixels during reading the reset components and reading the signal components, noise can be removed using the CDS, and a defect in shading in an image can be suppressed.

Furthermore, with the shortened CDS period, the horizontal scanning period can be shortened. Particularly, when the number of bits for the AD conversion is many and the AD conversion on a larger number of rows is necessary, such as for coping with the pixel mixture, for example, during a horizontal scanning period, since the AD conversion period becomes longer than the horizontal scanning period, the advantage of shortening the CDS period is enhanced.

The following will describe a solid-state imaging device according to embodiments (Embodiments 1 and 2) of the present invention in detail.

Embodiment 1

Hereinafter, the solid-state imaging device and the driving method of the same according to Embodiment 1 of the present invention will be described with reference to drawings.

FIG. 9 illustrates a structural plan view of an image capturing apparatus (camera apparatus) 100 including a solid-state imaging device 1 according to Embodiment 1 of the present invention.

As illustrated in FIG. 9, the image capturing apparatus 100 including the solid-state imaging device 1 includes: a pixel array (imaging unit) 10 that includes unit pixels 3 in rows and columns; a driving control unit 7 arranged outside the pixel array 10; signal holding units 41 arranged in the vertical columns; a column processing unit 26 including column analog/digital (AD) circuits (converters) 25; a reference signal generating unit 27 including a digital analog converter (DAC) 27a that supplies reference voltages for AD conversion to the column AD circuits 25 in the column processing unit 26; and an output circuit 28.

Furthermore, the driving control unit 7 includes: a horizontal scanning circuit (column scanning circuit) 12 for controlling a column address and scanning of a column; a vertical scanning circuit (row scanning circuit) 14 for controlling a row address and scanning of a row; and a communication/timing control unit 20 for receiving a master clock CLK0 through a terminal 5a, generating various internal clocks, and controlling, for example, the horizontal scanning circuit 12 and the vertical scanning circuit 14.

Furthermore, each of the unit pixels 3 is connected to the row control line 15 controlled by the vertical scanning circuit 14, and to a vertical signal line 19 through which a pixel signal is transmitted to the column processing unit 26.

Furthermore, each of the column AD circuits 25 includes a voltage comparator 252 that compares a reference voltage RAMP generated by the reference signal generating unit 27 with an analog pixel signal obtained from a corresponding one of the pixel units 3 through one of vertical signal lines 19 (H0, H1, . . . ) and a corresponding one of output lines 40 (ADIN0, ADIN1, . . . ) of a signal holding unit 41, for each of the row control lines 15 (V1, V2, . . . ); and a data storing unit 256 that is a memory holding a time period until a corresponding one of the voltage comparators 252 completes the comparison processing, and a result of counting by a corresponding one of counting units 254. The column AD circuits 25 have an n-bit AD conversion function.

Furthermore, a stepwise reference voltage RAMP generated in the reference signal generating unit 27 is fed to one input terminal RAMP of each of the voltage comparators 252, and a corresponding one of the output lines 40 of the signal holding units 41 is connected to the other one of the input terminals of each of the voltage comparators 252 so that pixel signal voltages are provided from the pixel array 10. Furthermore, an output signal of each of the voltage comparators 252 is supplied to a corresponding one of the counting units 254.

Furthermore, each of the column AD circuits 25 has a structure for allowing AD conversion by the processes of supplying the reference voltage RAMP to a corresponding one of the voltage comparators 252, simultaneously starting to count a clock signal, and comparing the reference voltage RAMP with the analog pixel signal fed through the corresponding one of the output lines 40 of the signal holding units 41, while the comparison continues until a pulse signal is obtained.

As well as the AD conversion, each of the column AD circuits 25 performs processing on a pixel signal, in a voltage mode, provided through each of the output lines 40 of the signal holding units 41. The processing is for calculating a difference between a signal level (noise level) of the pixel signal immediately after pixels are reset and an actual signal level Vsig corresponding to an amount of light incident on each of the unit pixels 3. Thereby, the solid-state imaging device of Embodiment 1 according to the present invention can remove the noise signal component referred to as a Fixed Pattern Noise (FPN) or a reset noise.

FIG. 9 illustrates the structure for extracting only the actual signal level Vsig by counting down the noise level and counting up the signal level. Furthermore, the pixel data digitalized by each of the column AD circuits 25 is transmitted to a horizontal signal line 18 through a horizontal selection switch that is not illustrated and is driven by a horizontal selection signal transmitted from the horizontal scanning circuit 12, and further transmitted to the output circuit 28.

With the structure, in the solid-state imaging device 1 according to Embodiment 1 of the present invention, the pixel array 10 in which light-receiving elements as charge generating units are arranged in a matrix outputs the pixel signals successively for each of the rows and columns. Then, an image corresponding to the pixel array 10 in which the light-receiving elements are arranged in the matrix, that is, a frame image is represented by a collection of the pixel signals of the entire pixel array 10.

Figure 1:
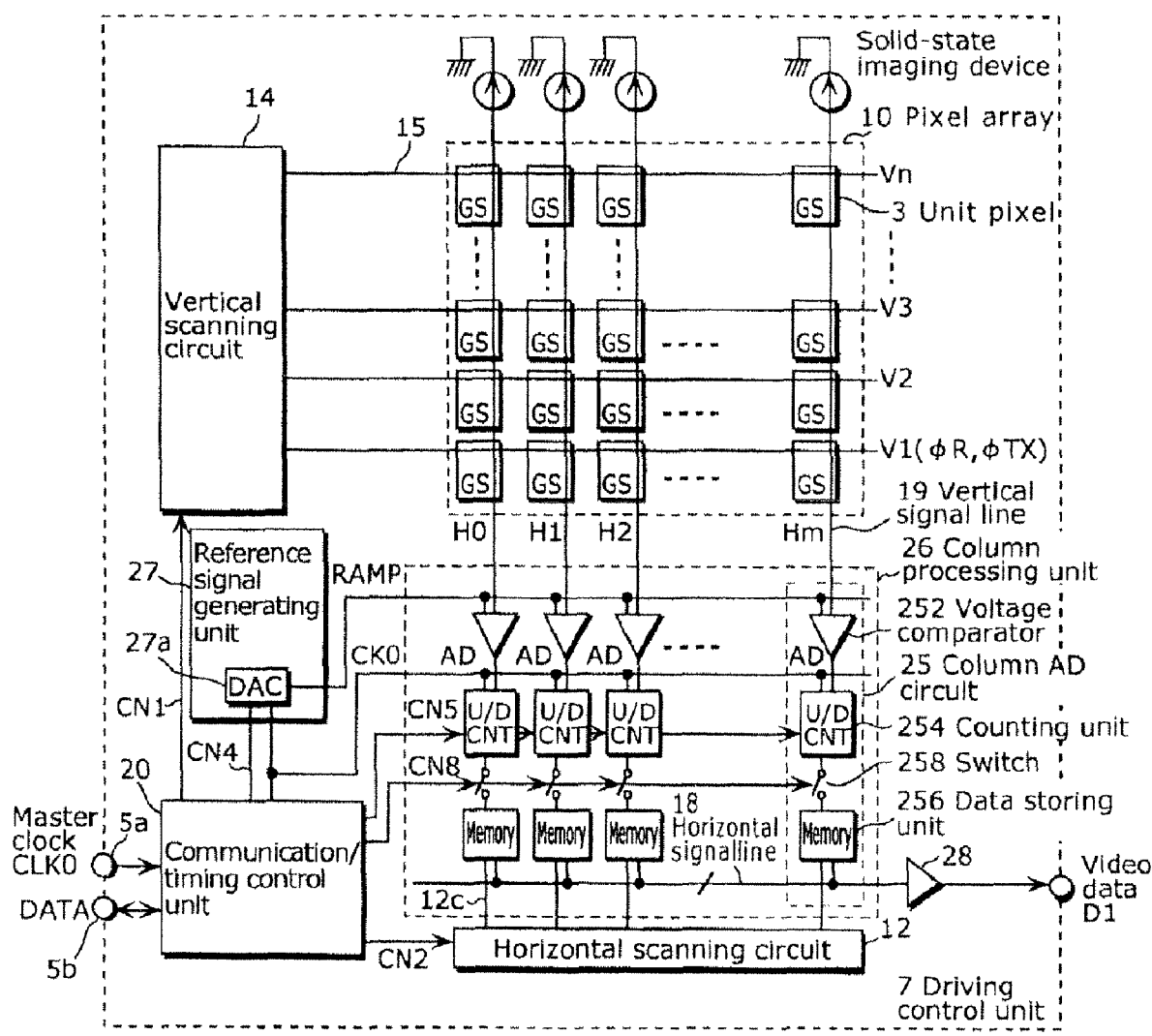
FIG. 1 illustrates a specific example of a circuit block diagram of a structure of a conventional solid-state imaging device.

As described above, the difference between the solid-state imaging device 1 of Embodiment 1 according to the present invention and the structure of the conventional example in FIG. 1 is that the solid-state imaging device 1 according to Embodiment 1 includes the signal holding units 41 each including a signal holding capacitor 262 and a signal holding switch 263 between a corresponding one of the vertical signal lines 19 and a corresponding one of the voltage comparators 252.

Next, FIG. 10 shows a timing chart for describing a driving method of the solid-state imaging device according to Embodiment 1 of the present invention. Hereinafter, the detailed operations of the column AD circuits 25 will be described with reference to FIG. 10.

First, the communication/timing control unit 20 resets a count value of each of the counting units 254 to an initial value "0", and sets the counting units 254 to the down-count mode, for the first read operation. After reading from each of the unit pixels 3 in any row Vx to the vertical signal lines 19 (H1, H2, . . . ) becomes stable, each of the signal holding switches 263 is turned on through the application of a control signal CN11 at the timing of t4 to provide the signal holding capacitors 262 with respective reset signals of the pixels.

Furthermore, after provision of the reset signals to the signal holding capacitors 262 becomes stable, the application of the control signals CN11 to the signal holding switches 263 is negated at the timing of t6 to turn off the signal holding switches 263. Accordingly, the signal holding capacitors 262 hold the reset signals of the pixels.

Furthermore, the communication/timing control unit 20 supplies the control data 4 for generating a reference voltage RAMP to the reference signal generating unit 27. Upon receipt of the control data 4, the reference signal generating unit 27 supplies a staircase waveform (RAMP waveform) that temporally varies in a staircase manner on the whole, as a comparison voltage for the one input terminal RAMP of each of the voltage comparators 252. The voltage comparators 252 compare the comparison voltages each having the RAMP waveform, with respective signal voltages each with a reset component of a pixel in any of the output lines 40 (ADINx). Here, the signal voltages are held by the signal holding capacitors 262 in the signal holding units 41.

Furthermore, each of the counting units 254 measures a time period for comparison by the voltage comparators 252 that are arranged in the columns, simultaneously when the reference voltage RAMP having the RAMP waveform is provided to one input terminal RAMP of each of the voltage comparators 252. In order to do so, the communication/timing control unit 20 supplies a count clock CK0 to a clock terminal of each of the counting units 254 in synchronization with the input of the voltage having the RAMP waveform from the reference signal generating unit 27 (t10). Thus, the counting units 254 start to count down the count clock CK0 from the initial value "0" as the first count operation.

Furthermore, each of the voltage comparators 252 compares the reference voltage RAMP having the ramp waveform from the reference signal generating unit 27, with the pixel signal voltage Vx supplied through a corresponding one of the output lines 40. When the voltages match with each other, the output level of the voltage comparators 252 is inverted from the high level to a low level (t12). In other words, each of the voltage comparators 252 compares a voltage signal corresponding to a reset component Vrst with a reference voltage RAMP, and a corresponding one of the counting units 254 measures a magnitude of the reset component Vrst using the count clock CK0 in the time axis direction to obtain a count value corresponding to the reset component Vrst. In other words, each of the counting units 254 counts down the count clock CK0 from the change in the RAMP waveform as the start point of a down-count operation to inversion of the output of a corresponding one of the voltage comparators 252, resulting in the count value corresponding to the reset component Vrst.

Furthermore, when a predetermined down-count period passes (t14), the communication/timing control unit 20 stops supplying (i) control data to the voltage comparators 252 and (ii) the count clock CK0 to the counting units 254. Thereby, the voltage comparators 252 stop generating the reference voltage RAMP having the ramp waveform.

In the first read operation, since the count operation is performed with detection of a reset level Vrst in the pixel signal voltage Vx, a reset component ΔV of each of the unit pixels 3 is read.

Thus, although the second read operation starts after the AD conversion on the reset level in the conventional technique, the operation of reading a signal component of a pixel in the analog manner is performed in parallel with the AD conversion operation on the reset component of a pixel according to the solid-state imaging device and the driving method of Embodiment 1 of the present invention, such that the CDS period is shortened.

Furthermore, as illustrated in FIG. 10, the countdown starts at the timing of t10, and the AD conversion operation is performed on the reset signal component ΔV. Simultaneously, each of the unit pixels 3 outputs the signal component Vsig to the vertical signal lines 19 through the application of a pixel-reading pulse øTR for reading a signal component accumulated in each of the pixels 3.

Here, the application of the control signals CN11 to the signal holding switches 263 is negated, and the signal holding switches 263 are in an off state. Furthermore, the signal holding capacitors 262 each holding the reset component of a pixel are electrically isolated from the vertical signal lines 19 to which the signal components are read.

Thus, even when the signal components of the pixels are read to the vertical signal lines 19 in the solid-state imaging device and the driving method of the same according to Embodiment 1 of the present invention, the signal holding capacitors 262 can hold the reset component of the pixels. Furthermore, the operations for reading pixel signals can be performed in parallel with the AD conversion operations on the reset components of the pixels.

Furthermore, upon completion of the read operations of the signal components of the pixels and the AD conversion operations on the reset components of the pixels, continuously, the second read operation on pixel signals starts. Furthermore, in the second read operation, the signal level Vsig corresponding to the amount of light incident on each of the unit pixels 3 and the reset component ΔV are read. The difference between the first and second read operations is that the counting units 254 are set to an up-count mode.

After reading from each of the unit pixels 3 in any row Vx to the vertical signal lines 19 (H1, H2, . . . ) becomes stable, each of the signal holding switches 263 are turned on with the application of the control signals CN11 at the timing of t16 to provide the signal holding capacitors 262 with the signal components Vsig of the pixels. Furthermore, after the signals provided to the signal holding capacitors 262 become stable, the application of the control signals CN11 to the signal holding switches 263 is negated at the timing of t18 to turn off the signal holding switches 263. Accordingly, the signal holding capacitors 262 hold the signal components Vsig of the pixels.

Furthermore, after reading respective signals to the signal holding capacitors 262 is stabilized, the reference signal generating unit 27 provides the reference voltage RAMP that temporally varies in a staircase manner on the whole as a ramp voltage to the voltage comparators 252. Upon the receipt, the voltage comparators 252 compare the reference voltage RAMP with the signal voltages Vx of the signal components of the pixels to be provided through any of the output line 40.

Here, the counting units 254 measure a time period for comparison by the voltage comparators 252, simultaneously when the reference voltage RAMP having the RAMP waveform is provided to one input terminal RAMP of each of the voltage comparators 252. In order to do so, the counting units 254 start an up-count operation as the second count operation in synchronization with a ramp waveform voltage supplied from the reference signal generating unit 27 (t20).

Furthermore, each of the voltage comparators 252 compare the reference voltage RAMP with the pixel signal voltages Vx supplied through any of the output lines 40. When the voltages match with each other, the output level of the voltage comparators 252 is inverted from the high level to the low level (t22).

In other words, the voltage comparators 252 compare a voltage signal corresponding to a reset component Vsig with a reference voltage RAMP, and the counting units 254 measure a magnitude of the reset component Vsig using the count clock CK0 in a time axis direction to obtain a count value corresponding to the reset component Vsig. In other words, each of the counting units 254 counts up the count clock CK0 from the change in the voltage comparator RAMP waveform as the start point of the up-count operation by the counting units 254 to inversion of the output of the voltage comparators 252, resulting in the count value corresponding to the reset component Vsig.

Furthermore, according to the driving method of the solid-state imaging device of Embodiment 1 of the present invention, the counting units 254 perform the down-count operation as the first read operation, and the up-count operation as the second read operation.

Accordingly, each of the counting units 254 automatically performs subtraction to obtain the count value corresponding to only the signal component Vsig with respect to "0" in the driving method of the solid-state imaging device of Embodiment 1 of the present invention.

Furthermore, according to the solid-state imaging device and the driving method of the same according to the present invention, each of the column AD circuits 25 can operate not only as a digital converting unit that converts an analog pixel signal to a digital pixel signal but also as a CDS (Correlated Double Sampling) processing function unit.

Furthermore, with the data converted from analog to digital transferred and held by the data storing unit 256, before the operations of the counting units 254 (t30), upon receipt of a memory transfer instruction pulse CN8 from the communication/timing control unit 20, a result of the count in the previous row of (Hx−1) is transferred to a corresponding one of the data storing unit 256.

Thereby, according to the solid-state imaging device and the driving method of the same according to the present invention, the operation of outputting a signal outside each through the data storing unit 256, the horizontal signal line 18, and the output circuit 28 is performed in parallel with reading of the current row of Vx, and the count operations by the counting units 254.

Thus, the difference between the first and second operations for reading signals is that the signal holding capacitors 262 to perform the AD conversion operations are electrically isolated from the vertical signal lines 19 to each of which the pixel signal is outputted, by turning off the signal holding switches 263 during the second AD conversion period on the signal components, in the solid-state imaging device and the driving method of the same according to Embodiment 1 of the present invention.

Thereby, the solid-state imaging device and the driving method can prevent the leakage components occurring in the charge-holding FD units from being supplied to the input units for the AD conversion, according to Embodiment 1 of the present invention.

As described above, according to the solid-state imaging device and the driving method of the same according to Embodiment 1 of the present invention, each of the column AD circuits 25 can perform the AD conversion operation in parallel with the operation of reading analog signals of pixels. Thereby, the CDS period can be shortened.

Furthermore, with the shortened CDS period, the occurrence of 1/f noise, in particular, a non-uniformity component can be suppressed in dark conditions.

Furthermore, during the AD conversion period of the signal components of pixels, an analog output unit that outputs an analog pixel signal can be electrically isolated from each of the signal holding units 41, and the leakage components occurring in the charge-holding FD units in the unit pixels 3 can be prevented from being supplied to the signal holding units 41, respectively.

As a result, a defect in an image caused by the floating diffusion (FD) leakage in dark conditions, such as the non-uniformity and flaw can be suppressed.

Furthermore, with the shortened CDS period, a horizontal scanning period can be shortened. Particularly, when the number of bits for the AD conversion is many and the AD conversion on a larger number of rows is necessary for coping with the pixel mixture, for example, during a horizontal scanning period, since the AD conversion period for pixels becomes longer than the horizontal scanning period for the pixels, the advantage of shortening the CDS period is enhanced.

As described above, according to the solid-state imaging device and the driving method of the same according to Embodiment 1 of the present invention, more preferably, a period (t2 to t6) from output of reset components of pixels in the analog manner to a second step of preventing a connection between analog output units of the pixel signals and signal holding capacitors is set equal to a period (t10 to t18) from the output of reset components of pixels in the analog manner to a fourth step of preventing a connection between the signal holding capacitors and the analog output units of the pixel signals.

With the structure, a state of reading reset components of pixels can be the same as a state of reading signal components of the pixels. More specifically, after the application of a frequency characteristic and a pixel reading pulse to a pixel SF circuit, the voltage variation in the charge-holding FD units, the vertical signal lines, and the signal holding units 41 up to the stabilization of output of pixel source followers can be equalized both in reading reset components of pixels and reading signal components of the pixels, enhancing the advantage of removing noise in Correlated Double Sampling.

For example, even when there is a difference and a variation in a period up to the stabilization in the charge-holding FD units between a center of pixels and a vicinity of the pixels, as long as the difference and the variation remain the same in the pixels in reading reset components of pixels and reading signal components of the pixels, noise can be removed using the CDS, and a defect in shading in an image can be suppressed.

The described is the reasons why it is preferable that the states in reading a reset component and reading a signal component should remain the same as much as possible.

Embodiment 2

Hereinafter, a solid-state imaging device and a driving method of the same according to Embodiment 2 of the present invention will be described with reference to drawings.

First, the structure of an image capturing apparatus and a solid-state imaging device according to Embodiment 2 of the present invention is the same as the structure illustrated in FIG. 9 of Embodiment 1 of the present invention.

FIG. 11 shows a timing chart for describing the driving method of the solid-state imaging device of Embodiment 2 of the present invention.

The difference between the driving method illustrated in FIG. 11 of the solid-state imaging device of Embodiment 2 and the driving method illustrated in FIG. 10 of the solid-state imaging device of Embodiment 1 is that the pixel reset signal øRS in the (x+1) row is applied during the AD conversion period of the signal component in the x-th row.

In other words, each of the signal holding capacitors 262 holds signal components of pixels in the x-th row at the timing of t18, and the vertical signal lines 19 from which the pixels are outputted can be electrically isolated from the signal holding capacitors 262, according to the driving method of the solid-state imaging device of Embodiment 2 of the present invention.

Thus, the signal holding capacitors 262 can hold the voltage necessary for the AD conversion on the signal components in the x-th row, even when the reset operation on the (x+1)-th row is performed during the AD conversion on the pixel signals, and the reset components of the (x+1)-th row are read to the vertical signal lines 19, according to the driving method of the solid-state imaging device of Embodiment 2 of the present invention.

Furthermore, according to the driving method of the solid-state imaging device according to Embodiment 2 of the present invention, reading the reset components in the (x+1)-th row in the analog manner can be performed in parallel with the AD conversion on the signal components of the pixels in the x-th row, thus shortening the AD conversion period.

(Comparison Between the Solid-State Imaging Devices in Embodiments 1 and 2 and Solid-State Imaging Devices of Reference Techniques)

The following describes the comparison in the solid-state imaging devices and the driving methods of the same between Embodiments 1 and 2 of the present invention and the reference techniques illustrated in FIGS. 4 to 13 to facilitate better understanding of the present invention.

Figure 4:
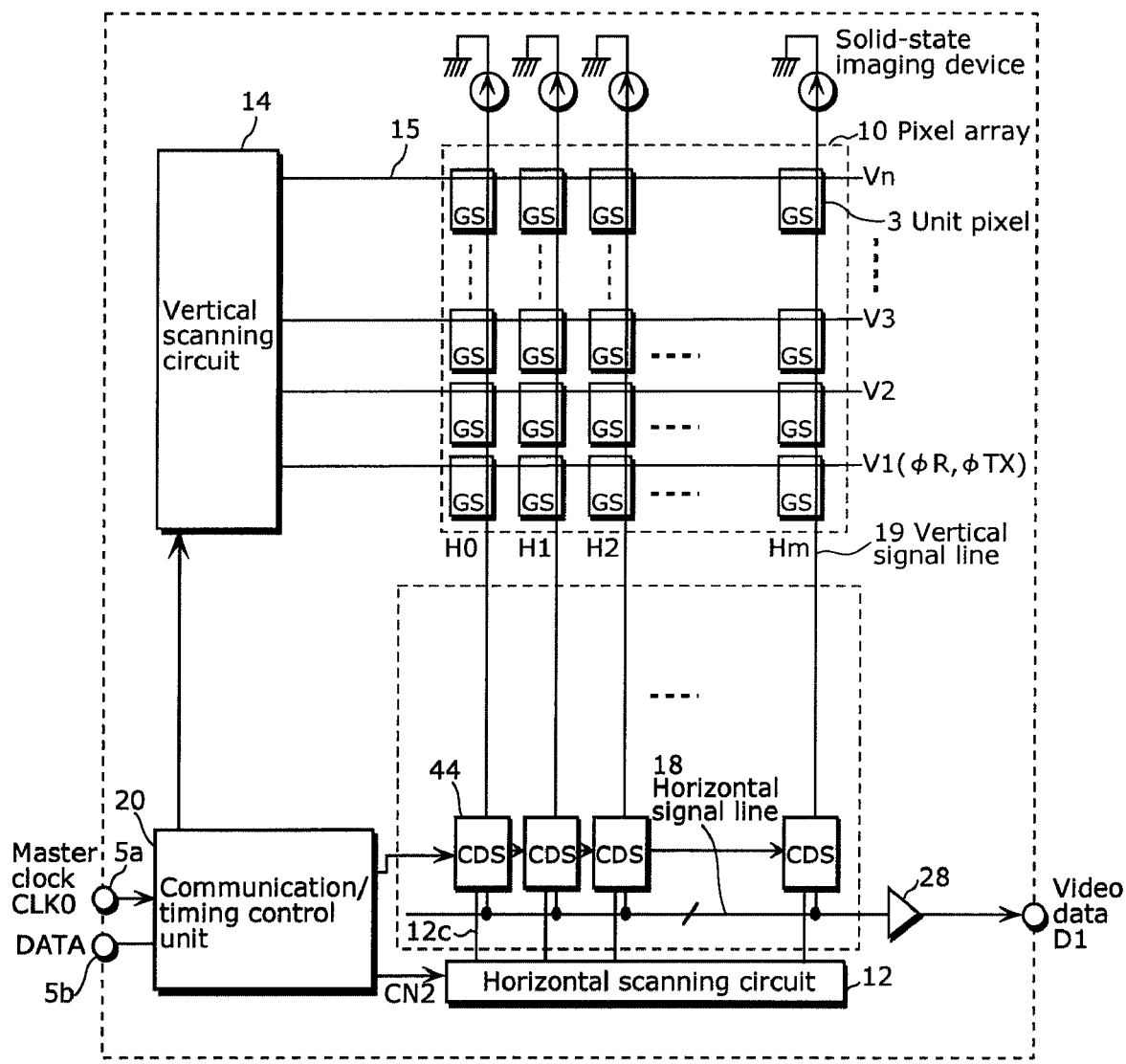
FIG. 4 illustrates, as a reference technique, a specific example of a circuit block diagram of a solid-state imaging device that does not include any column AD conversion unit.

FIG. 4 illustrates, as a reference technique, a solid-state imaging device that is of the column-parallel-output type and does not include any column Analog Digital Converter (ADC).

The difference between FIGS. 1 and 4 is that the structure in FIG. 4 does not include the voltage comparators 252 for the AD conversion and the counting units 254. Instead, the structure in FIG. 4 includes analog CDS circuits 44 that respectively function as noise cancel circuits and the signal holding units.

Figure 5:
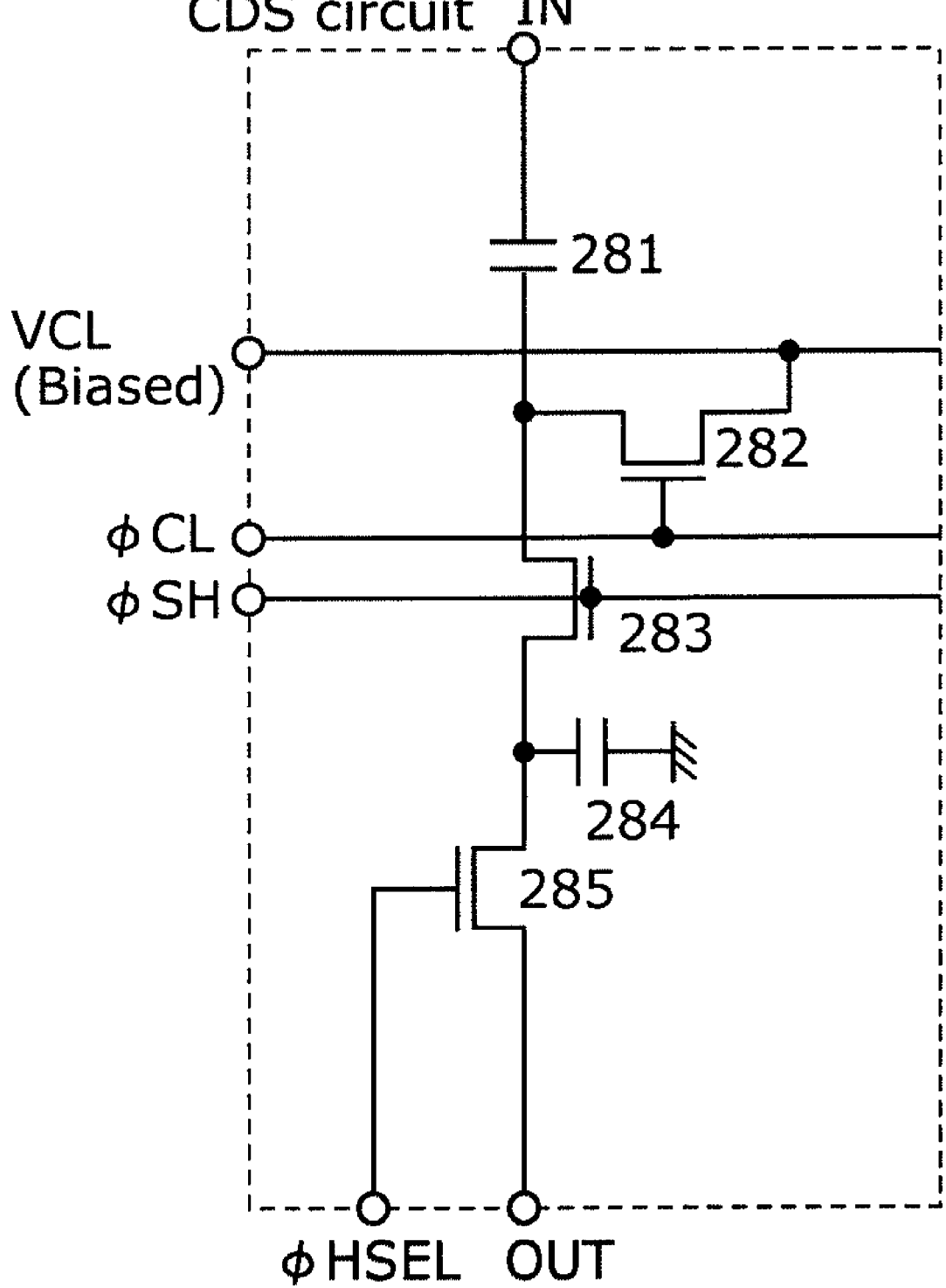
FIG. 5 illustrates, as a reference technique, a specific example of a circuit block diagram of an analog CDS circuit of the solid-state imaging device that does not include any column AD conversion unit.

Furthermore, as illustrated in FIG. 5, the analog CDS circuits 44 have various circuit systems.

Figure 6:
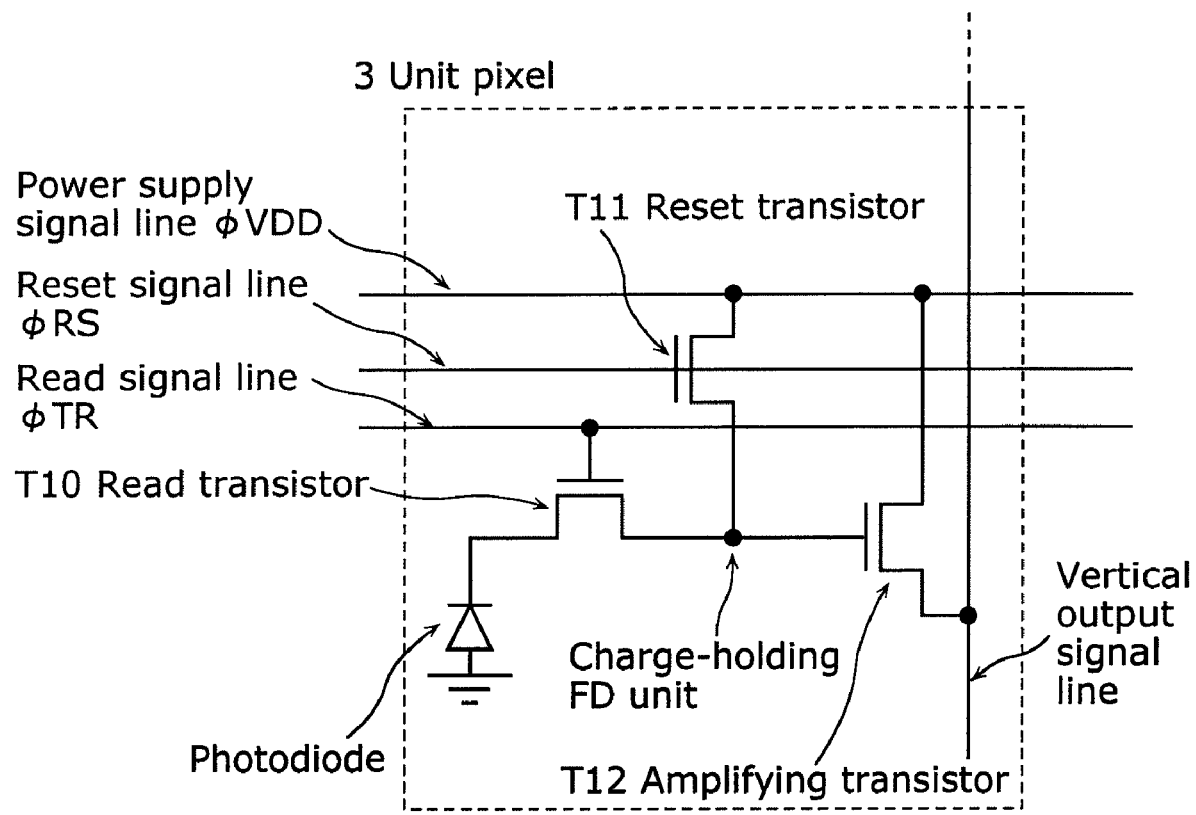
FIG. 6 illustrates a specific example of a block diagram of a circuit of a pixel according to the solid-state imaging device of the reference technique and the embodiments of the present invention.

Furthermore, FIG. 6 illustrates a structure of a pixel in the solid-state imaging device for showing a reference technique.

In FIG. 6, øRS denotes a reset pulse for a pixel.

Resetting the charge-holding FD units in the pixels to "HI" activates the source follower including an amplifying transistor T12 and a common power source to be applied to each of the columns, and enables selection of the pixels.

Furthermore, øTR denotes a pulse for reading a signal charge accumulated in a photodiode in each of the pixels. Although the timing at which the pixel is not selected is not described in FIG. 6, a power supply signal line øVDD is set to "low", and the reset pulse øRS is applied again, thus lowering the voltage in the charge-holding FD unit. The source follower is deactivated so that the pixel cannot be selected.

(a) in FIG. 7 shows, as a reference technique, a timing chart of timings of reading pixels by the solid-state imaging device that is of the column-parallel-output type and is configured of an analog circuit.

With reference to (a) in FIG. 7, a reset component is read with the application of the reset pulse øRSa. After reading the reset component becomes stable, signal components including the reset components of the pixels are read with the application of the pulse øTRa. CDS circuits including capacitor elements 281 and 284 in FIG. 5 remove a noise component of the reset components, and the capacitor element 284 only holds the signal components without the noise component.

In contrast, (b) in FIG. 7 shows a timing chart of timings of reading pixels by the solid-state imaging device that includes AD circuits and is illustrated in FIG. 1.

With reference to (b) in FIG. 7, since the column ADC operation is performed after the application of a pulse øRSb, the timing at which the pulse øTRb is applied is delayed from the timing at which the analog circuits read the pixels.

As described above, as the number of bits for the AD conversion increases or as the AD conversion period necessary for a horizontal scanning period is prolonged due to the driving operation, such as the pixel mixture, the horizontal scanning period becomes longer, in the solid-state imaging device of the reference technique. Thus, the fast read operation will be difficult.

However, the signal holding units 41 receiving the reset components of pixels are provided as the input units of the AD circuits, and the read operations of the signal components in the analog manner are performed in parallel with the AD conversion operations on the reset components in the solid-state imaging device and the driving method of the same according to Embodiments 1 and 2 of the present invention. Thus, the fast read operation can be performed.

Furthermore, since the solid-state imaging device illustrated in FIG. 1 cannot perform the reset operation on the next row until the AD conversion on the signal components is completed, the horizontal scanning period will be prolonged and the fast read operation will be difficult.

However, the signal holding units 41 receiving the signal components of pixels are provided as the input units of the AD circuits, and the read operation of the reset components in the analog manner is performed in parallel with the AD conversion operation on the signal components in the solid-state imaging device and the driving method of the same according to Embodiments 1 and 2 of the present invention. Thus, the fast read operation can be performed.

Furthermore, increase in 1/f noise and in FD leakage will be described with reference to FIG. 8.

In the reference techniques, 1/f noise occurs through trapping and releasing channel charges due to the influence of uncombined bond around a channel (Si, $SiO_2$ interfaces) through which electrons flow. For example, once electrons are trapped, an amount of drain current decreases because of the Coulomb repulsion present between the trapped electrons and the electrons that travel through the channel. In contrast, when the channel charges are released, conversely, the amount of drain current increases. Thus, discrete variation in the drain current causes noise. 1/f noise can be expressed by $vn^2/f=(q^2 \cdot dox^2 \cdot nt)/(e^2 \cdot W \cdot L \cdot f)$, where $vn^2$ denotes noise power, f denotes a frequency, W denotes a width of a transistor, L denotes a length of the transistor, dox denotes an insulating oxide layer, e denotes a dielectric constant, nt denotes a trap density, and q denotes a charge. The result is a function of 1/f. In other words, the influence of noise particularly becomes larger in the low frequency. As clarified from the expression, when the CDS period is prolonged and the solid-state imaging device operates in the low frequency, the probability that the electrons are trapped and released becomes higher and 1/f noise is degraded. Furthermore, since 1/f noise is indirectly proportional to W and L of the transistor, particularly, a micro-transistor to be used in a pixel has the significant influence of 1/f noise.

Next, FD leakage will be described. FIG. 8 shows a timing chart when the FD leakage occurs in the charge-holding FD units of pixels. Assuming that (i) a leakage component in a charge-holding FD unit is expressed by ΔVleak, (ii) a leakage component in the charge-holding FD unit occurring when a reset component is read is expressed by ΔVleak_r, and (iii) a leakage component in the charge-holding FD unit occurring when a signal component is read is expressed by ΔVleak_s, ΔVleak_r is almost constant in each pixel, because a period of reading the reset component does not depend on the amount of light incident on the pixel. In contrast, as the amount of light increases, the signal holding period in the charge-holding FD unit is prolonged. Thus, ΔVleak_s becomes larger than ΔVleak_r.

In other words, even when a difference in the leakage components between when a reset component is read and when a signal component is read is calculated, the ΔVleak component remains. Furthermore, when a circuit for calculating the difference in the leakage components is not newly provided to the solid-state imaging device, the FD leakage component when the signal component is read is expressed as ΔVleak_r+ΔVleak_s. In the CDS structure of the reference technique, an image including ΔVleak_s remains with noise occurring due to the FD leakage.

Since ΔVleak has a unique value for each pixel, defect in an image that causes increase in non-uniformity and flaw in a fixed position occurs. Furthermore, since the FD leakage causes not only non-uniformity and flaw in a fixed position but also lowering voltages in the charge-holding FD units, there is a problem of defect that lowers a dynamic range in the pixel SF circuits and a problem of degrading linearity to an amount of light incident on each pixel, due to variations in leakage components according to each amount of light.

However, the signal holding units 41 receiving the signal components of pixels are provided as the input units of the AD circuits, and during the AD conversion period of the signal components of pixels, analog output units that output analog pixel signals can be electrically isolated from the signal holding units 41, in the solid-state imaging device and the driving method of the same according to Embodiments 1 and 2 of the present invention. Thereby, since the device and method can prevent (i) the image defect that increases non-uniformity and flaws in an image in a fixed position, and (ii) the defect that lowers a dynamic range in the pixel SF circuits because of the lowered voltage in the charge-holding FD units due to the FD leakage. Thus, the problem of degrading linearity to an amount of light incident on each pixel, due to variations in leakage components according to each amount of light can be also prevented.

Although the signal holding unit 41 is represented by a switch in the circuit structure of Embodiments 1 and 2, the switch may be an N-channel/P-channel transistor pair. With the N-channel/P-channel transistor pair, the output voltage in the vertical signal line 19 (H0, H1, ...) from the ground level to the power supply level can be supplied without any voltage drop.

Although the N-channel/P-channel transistor pair is illustrated in FIG. 12, for example, when the output level of the vertical signal line 19 is higher than the ground level and is lower than the power supply level, the transistor may be solely of a N-channel type or of a P-channel type.

Although the vertical signal lines 19 are respectively connected to the signal holding units 41 in Embodiments 1 and 2, column amplifiers 42 may be respectively provided between the vertical signal lines 19 and the signal holding units 41 as illustrated in FIG. 13. With the column amplifiers 42, the output voltages of the pixel SF circuits can be amplified, and improvement on a signal-to-noise ratio and switching gains become possible.

FIG. 14 illustrates an example of a structure of one of the column amplifiers 42. The structure illustrated in FIG. 14 is for determining a gain of a source-grounding amplifier using a ratio of capacitor elements 276 and 277.

Since FIG. 14 is an example of a circuit, and as long as the column amplifier 42 is an analog amplifier that amplifies a voltage signal of the pixel SF circuit, the effect of the present invention can be obtained as well. Thus, the structure of the column amplifiers 42 is not limited to that of FIG. 14.

Figure 2:
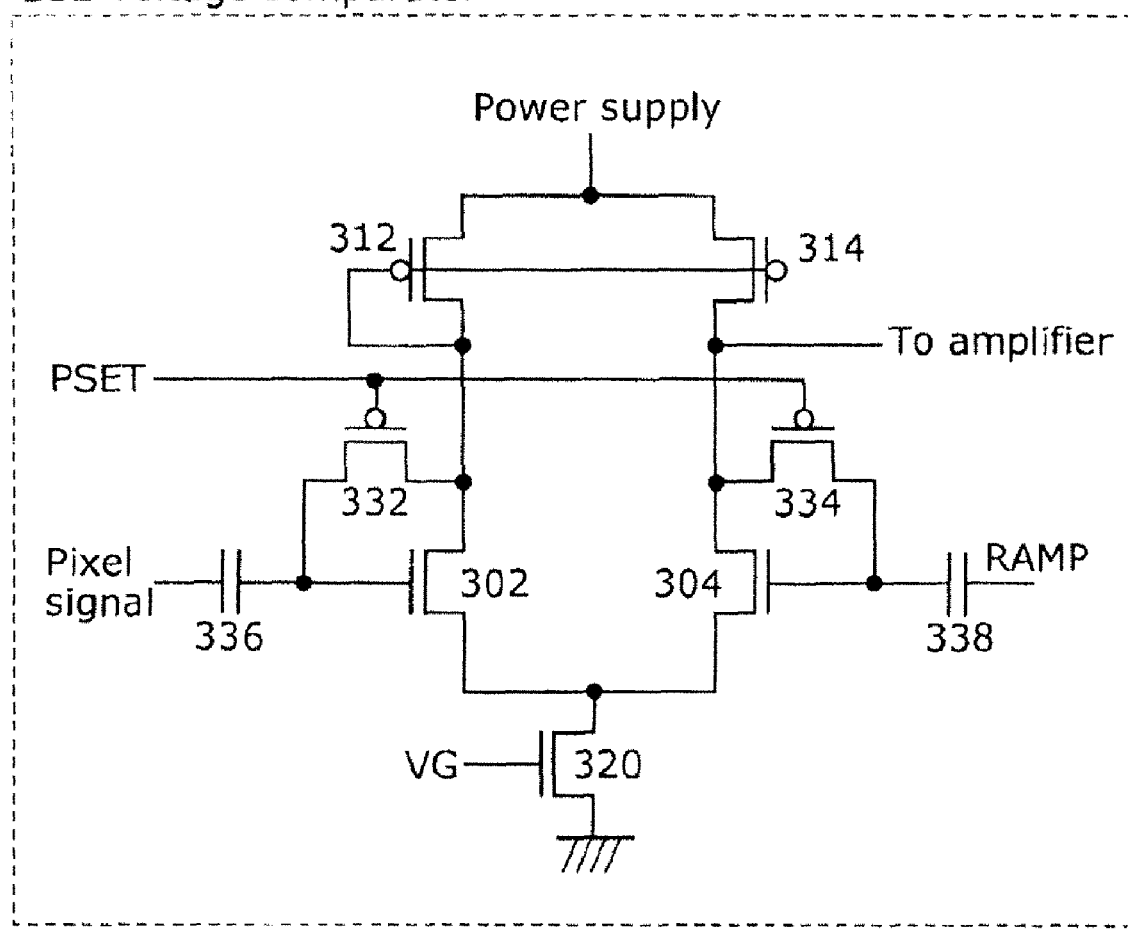
FIG. 2 illustrates a specific example of a circuit block diagram of a voltage comparator according to the conventional solid-state imaging device and embodiments of the present invention.

FIG. 2 illustrates an example of the structure of the voltage comparators 252. FIG. 2 illustrates a differential-input-type amplification structure. As long as the pixel signal unit in FIG. 2 holds voltage, and the AD conversion is performed on the signal voltage, the same effect of the present invention can be obtained as well. Thus, the structure of the voltage comparators 252 is not limited to that of FIG. 2.

Furthermore, the solid-state imaging device according to each of Embodiments 1 and 2 of the present invention includes a counter for each of the columns for the AD conversion. As long as the reset components and the signal components are respectively read and the AD conversions are performed, the same effect of the present invention can be obtained as well. Thus, the structure of the solid-state imaging device is not limited to such.

Figure 3:
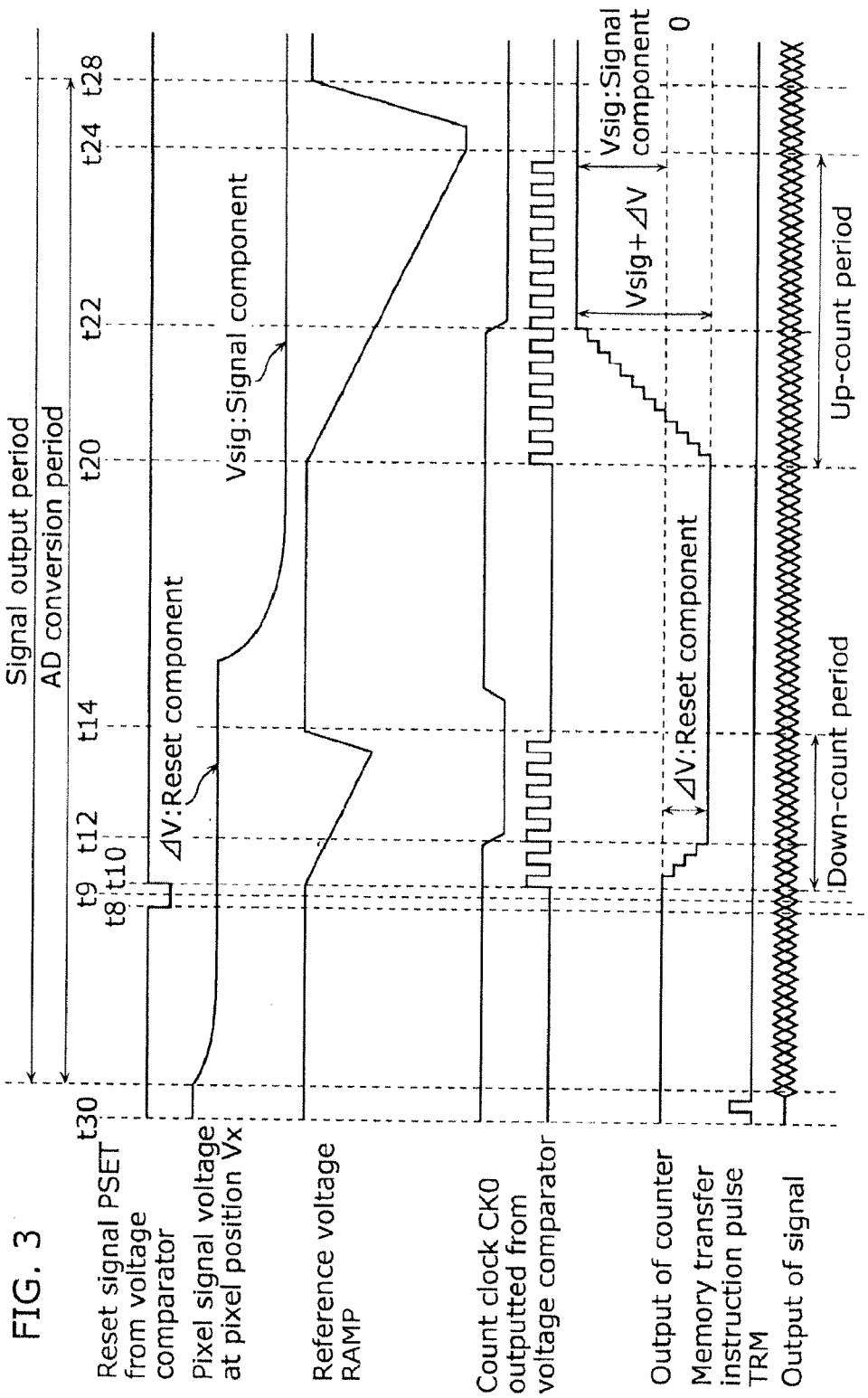
FIG. 3 illustrates a specific example of a timing chart of the conventional solid-state imaging device.

For example, in the AD conversion structure described as a conventional technique (FIG. 3) and including latching circuit units in the columns and a counting unit shared among the columns, reset components and signal components are respectively read in time series. Adding the signal holding units respectively provided between the vertical signal lines and the voltage comparators, to the AD conversion structure will produce the same effect as that of the present invention.

Furthermore, although the communication/timing control unit 20 illustrated in FIG. 9 performs the timing control in the solid-state imaging device of each of Embodiments 1 and 2 of the present invention, it may control input of data as illustrated in FIG. 9, as a system outside the solid-state imaging device.

More specifically, the image capturing apparatus 100 in FIG. 9 includes an external system 45 in addition to the dotted solid-state imaging device 1. FIG. 9 shows that the communication/timing control unit 20 of the solid-state imaging device 1 may be placed outside the dotted solid-state imaging device 1.

Thereby, the external system 45 can perform control as a system outside the solid-state imaging device 1, and the driving timing can be optionally set to any driving mode each having a different frame rate, such as a full-image reading mode, a pixel mixture mode, and a skipping mode.

Furthermore, the solid-state imaging devices according to Embodiments 1 and 2 are used in a digital camera, for example.

Such a digital camera includes: an optical system including a lens through which light from a subject is emitted to form an image on an imaging surface of a solid-state imaging element; a control unit that controls a driving operation on the solid-state imaging element; and an image processing unit that performs various signal processing on an output signal corresponding to the solid-state imaging element.

INDUSTRIAL APPLICABILITY

As described above, the solid-state imaging device and the driving method of the same according to the present invention are useful for an image capturing apparatus, such as a digital camera, a video camera, and a mobile phone with a camera.

The invention claimed is:
1. A solid-state imaging device, comprising:
pixel units arranged two-dimensionally in rows and columns;
signal holding units which are respectively provided for the columns of said pixel units and each of which is configured to hold an analog signal outputted from one of said pixel units in a corresponding one of the columns; and
AD conversion units each configured to convert, into a digital signal, the analog signal held by a corresponding one of said signal holding units, said AD conversion units being respectively provided for the columns of said pixel units,
wherein each of said signal holding units includes:
a switching element connected to a column signal line through which the analog signal is transmitted, the analog signal being outputted from the one of said pixel units in the corresponding one of the columns; and
a capacitor element that holds the analog signal, said capacitor element being connected to the column signal line through said switching element, and
said solid-state imaging device further comprises:
a driving control unit configured to maintain an off-state of said switching elements during conversion operations by said AD conversion units, and drive the conversion operations and read operations from said pixel units in parallel, the read operations being respectively performed for reading analog signals including the analog signal to the column signal lines,
each of said pixel units includes:
a photo-electric conversion unit configured to convert light into a signal charge;
a charge holding unit configured to hold the signal charge transferred from said photo-electric conversion unit;
an amplifying unit configured to amplify the signal charge held by said charge holding unit; and a reset unit configured to reset the signal charge held by said charge holding unit, said solid-state imaging device further comprises a driving control unit configured to drive said pixel units, said signal holding units, and said AD conversion units, said driving control unit is configured to drive each of operations from a first period to a fourth period, during the first period, the analog signal (i) outputted by said amplifying unit and (ii) indicating a reset component is read from the one of said pixel units while said charge holding unit is reset, during the second period, the analog signal (i) held by said signal holding unit and (ii) indicating the reset component is converted into the digital signal, during the third period, the analog signal (i) outputted by said amplifying unit and (ii) indicating a signal component is read from the one of said pixel units while said charge holding unit holds the signal charge transferred from said photo-electric conversion unit, during the fourth period, the analog signal (i) held by said signal holding unit and (ii) indicating the signal component is converted into the digital signal, and said driving control unit is configured to perform the driving so that at least one of (i) the second period and the third period overlap each other and (ii) the fourth period and the first period corresponding to a row other than a current row overlap each other.

2. The solid-state imaging device according to claim 1, wherein said driving control unit is configured to perform the driving so that the second period and the third period overlap each other.

3. The solid-state imaging device according to claim 2, wherein said driving control unit is configured to cause each of said capacitor elements to hold the analog signal (i) outputted during the first period and (ii) indicating the reset component, by turning on said switching elements, and to set, in the off state, said switching elements in the conversion during the second period.

4. The solid-state imaging device according to claim 1, wherein said driving control unit is configured to perform the driving so that the fourth period and the first period corresponding to the row other than the current row overlap each other.

5. The solid-state imaging device according to claim 4, wherein said driving control unit is configured to cause each of said capacitor elements to hold the analog signal (i) outputted during the third period and (ii) indicating the signal component, by turning on said switching elements, and to set, in the off state, said switching elements in the conversion during the fourth period.

6. The solid-state imaging device according to claim 1, wherein said driving control unit is configured to perform the driving so that (i) the second period and the third period overlap each other and (ii) the fourth period and the first period corresponding to the row other than the current row overlap each other.

7. The solid-state imaging device according to claim 1, further comprising column amplifiers each of which amplifies the analog signal outputted from the one of said pixel units in the corresponding one of the columns, said column amplifiers being provided for the columns of said pixel units and being connected to said capacitor elements through said switching elements, respectively.

8. A method for driving a solid-state imaging device, wherein the solid-state imaging device includes:

pixel units arranged two-dimensionally in rows and columns;

signal holding units which are respectively provided for the columns of the pixel units and each of which is configured to hold an analog signal outputted from one of the pixel units in a corresponding one of the columns; and AD conversion units each configured to convert, into a digital signal, the analog signal held by a corresponding one of the signal holding units, the AD conversion units being respectively provided for the columns of the pixel units, each of the signal holding units includes:

a switching element connected to a column signal line through which the analog signal is transmitted, the analog signal being outputted from the one of the pixel units in the corresponding one of the columns; and a capacitor element that holds the analog signal, the capacitor element being connected to the column signal line through the switching element, each of the pixel units includes:

a photo-electric conversion unit configured to convert light into a signal charge;

a charge holding unit configured to hold the signal charge transferred from the photo-electric conversion unit;

an amplifying unit configured to amplify the signal charge held by the charge holding unit; and a reset unit configured to reset the signal charge held by the charge holding unit, said method comprises:

reading analog signals including the analog signal from the pixel units to column signal lines including the column signal line, the analog signals belonging to one row, and the pixel units being arranged two-dimensionally in the rows and the columns;

holding, in the signal holding units provided for the columns of the pixel units, the analog signals outputted from the pixel units in the columns;

converting the analog signals into digital signals including the digital signal using the AD conversion units respectively provided for the columns of the pixel units, the analog signals being respectively held by the signal holding units; and reading analog signals in a row other than a current row, in parallel with said converting, and an off-state of switching elements including the switching element is maintained during conversion operations by the AD conversion units in said converting, during a first period, the analog signal (i) outputted by the amplifying unit and (ii) indicating a reset component is read from the one of the pixel units while the charge holding unit is reset, during a second period, the analog signal (i) held by the signal holding unit and (ii) indicating the reset component is converted into the digital signal, during a third period, the analog signal (i) outputted by the amplifying unit and (ii) indicating a signal component is read from the one of the pixel units while the charge holding unit holds the signal charge transferred from the photo-electric conversion unit, during a fourth period, the analog signal (i) held by the signal holding unit and (ii) indicating the signal component is converted into the digital signal, and at least one of (i) the second period and the third period overlap each other and (ii) the fourth period and the first period corresponding to a row other than a current row overlap each other.

9. A camera comprising the solid-state imaging device according to claim 1.

* * * * *